US012730484B2

(12) United States Patent
Niu et al.

(10) Patent No.: US 12,730,484 B2
(45) Date of Patent: Sep. 8, 2026

(54) ALWAYS ON DISPLAY METHOD AND ELECTRONIC DEVICE

(71) Applicant: HONOR DEVICE CO., LTD., Shenzhen (CN)

(72) Inventors: Qunchao Niu, Shenzhen (CN); Chunjie Li, Shenzhen (CN); Yao Xiao, Shenzhen (CN); Pengliang Zhen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 19/304,877

(22) Filed: Aug. 20, 2025

(65) Prior Publication Data

US 2025/0370513 A1 Dec. 4, 2025

Related U.S. Application Data

(63) Continuation of application No. PCT/CN2023/118658, filed on Sep. 13, 2023.

(51) Int. Cl.

*G06F 1/16* (2006.01)
*H04M 1/02* (2006.01)

(52) U.S. Cl.

CPC .......... *G06F 1/1677* (2013.01); *G06F 1/1652* (2013.01); *H04M 1/0216* (2013.01); *H04M 1/0245* (2013.01); *H04M 1/0268* (2013.01); *H04M 1/0243* (2013.01); *H04M 2201/38* (2013.01)

(58) Field of Classification Search

CPC .... G06F 1/1677; G06F 1/1652; G06F 1/1641; G06F 1/1647; G06F 1/1694; G06F 1/3265; H04M 1/0216; H04M 1/0245; H04M 1/0268; H04M 1/0243; H04M 2201/38

See application file for complete search history.

(56) References Cited

U.S. PATENT DOCUMENTS

2020/0233461 A1* 7/2020 Kim ...................... G06F 1/1681
2022/0044607 A1* 2/2022 Kim ...................... G06F 1/1677
2022/0122514 A1* 4/2022 Kwon .................. G06F 3/1446

(Continued)

FOREIGN PATENT DOCUMENTS

CN 108243282 A 7/2018
CN 110389733 A 10/2019

(Continued)

*Primary Examiner* — Premal R Patel
(74) *Attorney, Agent, or Firm* — Maier & Maier, PLLC

(57) ABSTRACT

An always on display method and an electronic device related to the field of terminal technologies. Therefore, the following problem can be resolved: when an electronic device is in a folded state, in both an inverted state and a back screen upward state, a back screen cannot display always on display information, or a back screen flickers when displaying always on display information. The method includes: when a foldable screen is in a folded state, a main screen faces upward, a back screen faces downward, and the back screen is screen-off. When an always on display function of the electronic device is in an enabled state, a back screen always on display function is in an enabled state, and an inverted screen-off display function is in an enabled state, the main screen displays an always on display interface in response to an always on display operation.

11 Claims, 12 Drawing Sheets

(56) References Cited

U.S. PATENT DOCUMENTS

| | | | | |
|---|---|---|---|---|
| 2022/0191313 | A1 | 6/2022 | Pan et al. | |
| 2022/0413553 | A1* | 12/2022 | Zhang | G06F 1/1677 |
| 2023/0185508 | A1* | 6/2023 | Chung | G06F 1/1677 715/761 |
| 2024/0077930 | A1* | 3/2024 | Alverson | G06F 1/3206 |

FOREIGN PATENT DOCUMENTS

| | | | |
|---|---|---|---|
| CN | 110536004 | A | 12/2019 |
| CN | 110602315 | A | 12/2019 |
| CN | 111475077 | A | 7/2020 |
| CN | 113498501 | A | 10/2021 |
| CN | 115981453 | A | 4/2023 |
| CN | 116027877 | A | 4/2023 |
| CN | 116592756 | A | 8/2023 |

* cited by examiner

ALWAYS ON DISPLAY METHOD AND ELECTRONIC DEVICE

CROSS-REFERENCE TO RELATED APPLICATIONS

This application is a continuation of International Application No. PCT/CN2023/118658, filed on Sep. 13, 2023, which is incorporated herein by reference in its entirety.

TECHNICAL FIELD

Embodiments of this application relate to the field of terminal technologies, and in particular, to an always on display method and an electronic device.

BACKGROUND

AOD may also referred to as always on display, always on display, or always on display, and is a function that an electronic device displays always on display information (for example, displays time, incoming call information, push messages, and other content) in a partial area of a screen without keeping the full screen on.

For an electronic device having a foldable screen that folds outward (or referred to as an outward-folding screen), a main screen and a back screen may be formed after the electronic device is folded along a folding edge (or a folding shaft). In related technologies, after the electronic device enters a screen-off state, the electronic device displays the always on display information on the main screen. In a scenario, when it is detected that the electronic device is in an inverted state (the main screen faces downward and the back screen faces upward), the electronic device disables an always on display function, that is, the main screen and the back screen are in a completely screen-off state and do not display any content. In another scenario, when it is detected that the electronic device is in a back screen upward state (the main screen faces downward), the main screen of the electronic device is switched to the back screen for displaying the always on display information, and the main screen is screen-off.

It can be learned that the always on display function needs to be disabled in the inverted state, and a partial area of the back screen needs to be lit up in the back screen upward state. In addition, for the foldable screen in a folded state, the inverted state is essentially similar to the back screen upward state. Therefore, there is a conflict between the foregoing two scenarios. In a scenario in which the electronic device is in the folded state and the always on display function is enabled, if the electronic device satisfies both the inverted state and the back screen upward state, the back screen cannot display the always on display information, or the back screen flickers when displaying the always on display information.

SUMMARY

Embodiments of this application provide an always on display (AOD) method and an electronic device. Therefore, the following problem can be resolved: When an electronic device is in a folded state, in both an inverted state and a back screen upward state, a back screen cannot display always on display information, or a back screen flickers when displaying always on display information.

According to a first aspect, an always on display method is provided. The method is applied to an electronic device including a foldable screen. The foldable screen is capable of being folded into a main screen and a back screen. When the foldable screen is in a folded state, the main screen faces away from the back screen. The electronic device includes a first processor and a second processor. The method includes: When the foldable screen is in the folded state, the main screen faces upward, the back screen faces downward, and the back screen is screen-off. When an always on display function of the electronic device is in an enabled state, a back screen always on display function is in an enabled state, and an inverted screen-off display function is in an enabled state, the main screen displays an always on display interface in response to an always on display operation. Based on a flip operation performed by a user on the electronic device in the folded state, the main screen faces downward, the back screen faces downward, and the second processor of the electronic device reports first information to the first processor and does not report second information (the first information is different from the second information). Based on the first information, the back screen displays an always on display interface, and the main screen is screen-off.

When the foldable screen is in the folded state, the main screen faces upward, the back screen faces downward, and the back screen is screen-off. When the always on display function of the electronic device is enabled, the back screen always on display function is in a disabled state, and the inverted screen-off display function is in the enabled state, the main screen displays the always on display interface in response to the always on display operation. Based on the flip operation performed by the user on the electronic device in the folded state, the main screen faces downward, the back screen faces upward, and the second processor of the electronic device reports the second information to the first processor and does not report the first information. Based on the second information, the main screen is screen-off, and the back screen is screen-off.

Based on the first aspect, in related technologies, when the foldable screen of the electronic device is in the folded state, the main screen faces upward, the back screen faces downward, and the back screen is screen-off. When the always on display function of the electronic device is enabled, the back screen always on display function is in the disabled state, and the inverted screen-off display function is in the enabled state, the main screen displays the always on display interface in response to the always on display operation. Then, when the user performs the flip operation on the electronic device in the folded state, the main screen faces downward, the back screen faces upward, and the second processor of the electronic device reports the second information to the first processor and does not report the first information. In this way, the main screen and the back screen of the electronic device are both screen-off.

However, in this application, when the foldable screen of the electronic device is in the folded state, the main screen faces upward, the back screen faces downward, and the back screen is screen-off. When the always on display function of the electronic device is enabled, the back screen always on display function is in the enabled state, and the inverted screen-off display function is in the enabled state, the main screen displays the always on display interface in response to the always on display operation. Then, when the user performs the flip operation on the electronic device in the folded state, the main screen faces downward, the back screen faces upward, and the second processor of the electronic device reports the first information to the first processor and does not report the second information. In this way, the main screen of the electronic device is screen-off, and the back screen of the electronic device displays the always on display interface. Therefore, the following problem can be resolved: When the electronic device is in the folded state, in both an inverted state and a back screen upward state, the back screen cannot display always on display information, or the back screen flickers when displaying always on display information.

Optionally, the always on display function is used to instruct the electronic device to display the always on display interface in response to the always on display operation.

Optionally, when the always on display function of the electronic device in an unfolded state is enabled, the electronic device displays the always on display interface on the foldable screen (including a main screen display area and a back screen display area) in response to the always on display operation. When the always on display function of the electronic device in the unfolded state is enabled, the electronic device displays the always on display interface on the main screen in response to the always on display operation.

Optionally, when the back screen always on display function is enabled, and the electronic device is in the folded state, in response to the always on display operation, the back screen displays the always on display interface, and the main screen is screen-off.

Optionally, the electronic device enables the back screen always on display function in response to the always on display operation; or the electronic device enables the back screen always on display function after enabling the always on display function.

Optionally, the inverted screen-off display function is in the enabled state. When the user inverts the electronic device, the foldable screen is screen-off. That the foldable screen is screen-off includes that the foldable screen does not display any content.

Optionally, when the foldable screen is in the unfolded state, and the user inverts the electronic device, the foldable screen (including the main screen display area and the back screen display area) of the electronic device is screen-off and does not display any content. When the foldable screen is in the folded state, and the user inverts the electronic device, both the main screen and the back screen of the electronic device are screen-off and do not display any content.

Optionally, that the main screen faces upward means that an orientation of the main screen is opposite to a direction of gravity, and that the back screen faces downward means that an orientation of the back screen is the same as the direction of gravity. Correspondingly, that the main screen faces downward means that the orientation of the main screen is the same as the direction of gravity, and that the back screen faces upward means that the orientation of the back screen is opposite to the direction of gravity.

In a possible implementation of the first aspect, the first information includes that the electronic device is in the back screen upward state, and the second information includes that the electronic device is in the inverted state.

In a possible implementation of the first aspect, that the second processor of the electronic device reports the first information to the first processor and does not report the second information includes: determining, by the second processor of the electronic device, that the electronic device is in the back screen upward state, and reporting the first information to the first processor; and after the second processor of the electronic device reports the first information to the first processor, determining, by the second processor of the electronic device, that the electronic device is in the inverted state, and intercepting the second information.

In this implementation, when the second processor of the electronic device determines that the electronic device is in the back screen upward state, the second processor reports the first information to the first processor, that is, reports the information indicating the back screen upward state. However, when the second processor of the electronic device determines that the electronic device is in the inverted state, the second information is intercepted, that is, information indicating the inverted state is intercepted. In this way, based on the first information, the first processor of the electronic device can enable the back screen to display the always on display interface and the main screen to be screen-off. Therefore, the following problem can be resolved: When the electronic device is in the folded state, in both the inverted state and the back screen upward state, the back screen cannot display always on display information, or the back screen flickers when displaying always on display information.

In a possible implementation of the first aspect, the determining, by the second processor of the electronic device, that the electronic device is in the inverted state, and intercepting the second information includes: determining, by the second processor of the electronic device, that the electronic device is in the inverted state, subscribing, by the first processor of the electronic device, to the second processor for a back screen upward event, and intercepting the second information. The subscription for the back screen upward event indicates that the second processor reports the first information to the first processor when determining that the electronic device is in the back screen upward state.

Optionally, when the second processor of the electronic device determines that the electronic device is in the inverted state, if the first processor of the electronic device does not subscribe to the second processor for the back screen upward event, the second information is not intercepted. In other words, the second processor of the electronic device reports the second information to the first processor.

In a possible implementation of the first aspect, the subscribing, by the first processor of the electronic device, to the second processor for a back screen upward event includes: after the electronic device displays the always on display interface on the main screen in response to the always on display operation, subscribing, by the first processor of the electronic device, to the second processor for the back screen upward event.

In a possible implementation of the first aspect, that the second processor of the electronic device does not report the second information to the first processor includes: determining, by the second processor of the electronic device, that the electronic device is in the inverted state, and obtaining a first flag bit, where the first flag bit indicates whether the second processor intercepts the second information; and if the first flag bit indicates that the second processor intercepts the second information, skipping reporting, by the second processor, the second information to the first processor.

In a possible implementation of the first aspect, the method further includes: after the first processor of the electronic device subscribes to the second processor for the back screen upward event, setting, by the second processor of the electronic device, the first flag bit.

According to a second aspect, an always on display method is provided, and is applied to an electronic device including a foldable screen. The foldable screen is capable of being folded into a main screen and a back screen. When the foldable screen is in a folded state, the main screen faces away from the back screen. The method includes: When the foldable screen is in an unfolded state, the foldable screen is screen-on. The foldable screen faces downward based on a flip operation performed by a user on the electronic device in the unfolded state. When an always on display function of the electronic device is enabled, and an inverted screen-off display function is in an enabled state, the foldable screen is screen-off in response to an always on display operation. Then, based on a folding operation performed by the user on the electronic device in the unfolded state, the main screen faces downward, and the back screen faces upward. In response to the folding operation, the main screen displays an always on display interface, and the back screen is screen-off. After the main screen displays the always on display interface, and the back screen is screen-off, the main screen is screen-off, and the back screen displays an always on display interface.

Based on the second aspect, when the foldable screen is in the unfolded state, and the foldable screen is screen-on, after the user flips the electronic device in the unfolded state, the foldable screen faces downward. The always on display function of the electronic device is enabled, and the inverted screen-off display function is in the enabled state. Therefore, the foldable screen is screen-off in response to the always on display operation. The user performs a folding operation on the electronic device in the unfolded state, the main screen faces downward, and the back screen faces upward. Because the main screen first displays the always on display interface, the back screen is screen-off. After the main screen displays the always on display interface, and the back screen is screen-off, the main screen is screen-off again, and the back screen displays the always on display interface again. Therefore, the following problem can be resolved: After the electronic device in an inverted state enters an always on display state, and the foldable screen is switched to the folded state from the unfolded state, the back screen cannot be lit up.

Optionally, in response to the flip operation, the electronic device enables the inverted screen-off display function. Alternatively, in response to the always on display operation, the electronic device enables the inverted screen-off display function.

In a possible implementation of the second aspect, in response to the folding operation, the main screen displays the always on display interface, and the back screen is screen-off. That after the main screen displays the always on display interface, and the back screen is screen-off, the main screen is screen-off, and the back screen displays an always on display interface includes: reading a second flag bit in response to the folding operation, where the second flag bit indicates whether the electronic device is in an inverted screen-off state, and if the second flag bit indicates that the electronic device is currently in the inverted screen-off state, the main screen displays the always on display interface, and the back screen is screen-off; and after the main screen displays the always on display interface, and the back screen is screen-off, the main screen is screen-off, and the back screen displays the always on display interface.

In a possible implementation of the second aspect, after the foldable screen is screen-off in response to the always on display operation, the method further includes: setting, by the first processor of the electronic device, the second flag bit.

According to a third aspect, an electronic device is provided. The electronic device has a function of implementing any one of the first aspect or the second aspect. The function may be implemented by hardware, or may be implemented by hardware by executing corresponding software. The hardware or the software includes one or more modules corresponding to the function.

According to a fourth aspect, an electronic device is provided. The electronic device includes a foldable screen, a memory, and one or more processors. The foldable screen is capable of being folded into a main screen and a back screen. When the foldable screen is in a folded state, the main screen faces away from the back screen. The memory is configured to store computer instructions. When the electronic device runs, the processor executes the computer instructions in the memory, to enable the electronic device to perform the method according to any one of the first aspect or perform the method according to any one of the second aspect.

According to a fifth aspect, a chip system is provided. The chip system includes: at least one processor and an interface. The interface is configured to receive instructions and transmit the instructions to the at least one processor. The at least one processor runs the instructions to enable an electronic device to perform the method according to any one of the first aspect, or perform the method according to any one of the second aspect.

According to a sixth aspect, a non-transitory computer-readable storage medium is provided. The non-transitory computer-readable storage medium stores instructions. When the instructions run on a computer, the computer is enabled to perform the method according to any one of the first aspect or perform the method according to any one of the second aspect.

According to a seventh aspect, a computer program product including instructions is provided. When the computer program product runs on a computer, the computer is enabled to perform the method according to any one of the first aspect or perform the method according to any one of the second aspect.

For the technical effects brought by any one of the implementations of the second aspect to the seventh aspect, reference may be made to the technical effects brought by different implementations in the first aspect. Details are not described herein again.

DETAILED DESCRIPTION OF EMBODIMENTS

Embodiments of this application provide an always on display (AOD) method. The method may be applied to an electronic device having a foldable screen. The foldable screen is capable of being folded into at least two screens. For example, the foldable screen may be folded along a folding edge or a folding shaft into a first screen and a second screen. In other words, the at least two screens include the first screen and the second screen.

The foldable screen in embodiments of this application may be a foldable screen that folds outward (outward-folding screen for short). In an example in which the foldable screen is capable of being folded into the first screen and the second screen, after the foldable screen is folded outward, the first screen faces away from the second screen.

Figure 1:
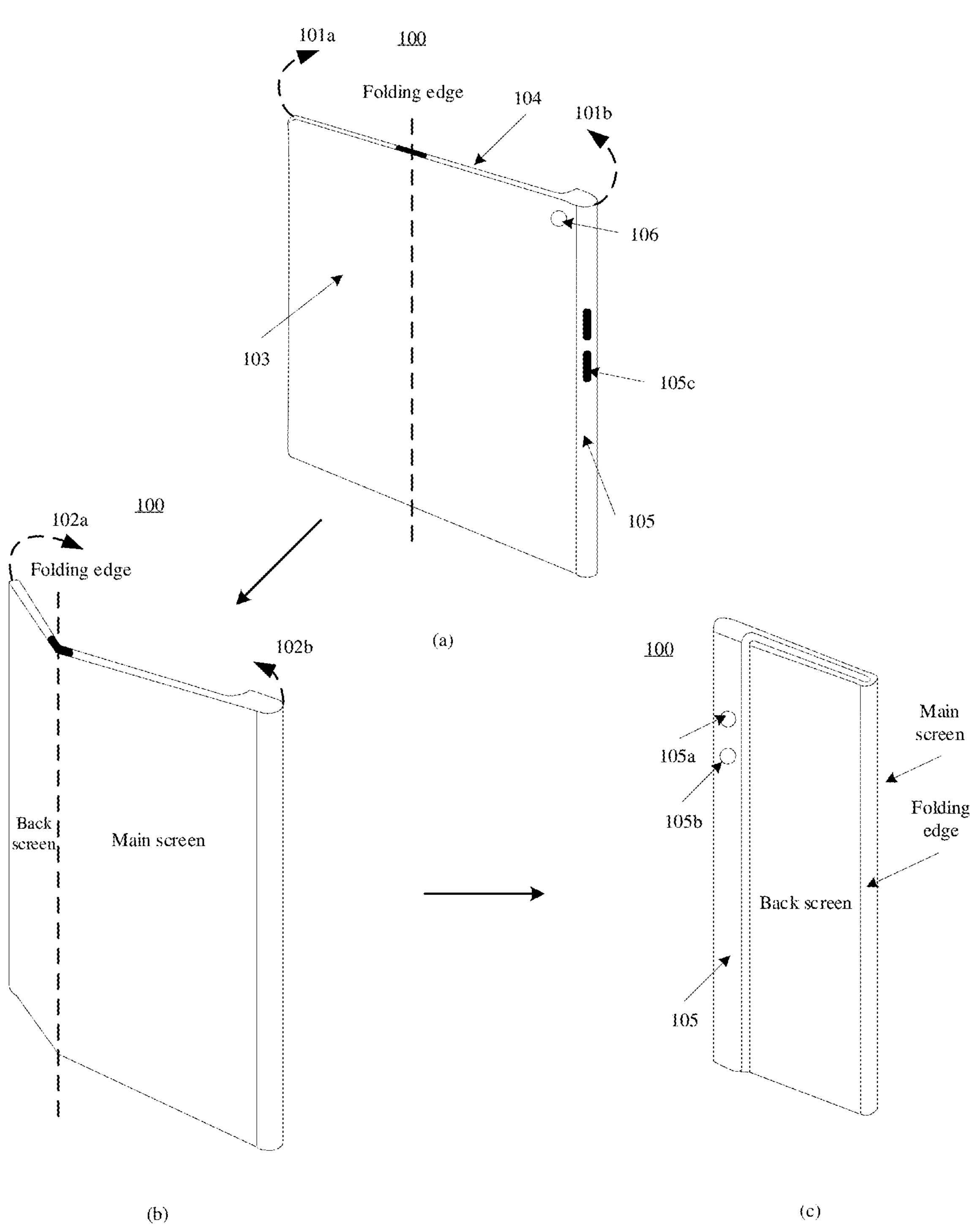
FIGS. 1(*a*)-(*c*) are diagrams of an electronic device including a foldable screen according to an embodiment of this application.

For example, with reference to FIG. 1, FIG. 1 is a diagram of a product form of an electronic device 100 having an outward-folding screen according to an embodiment of this application. (a) in FIG. 1 is a diagram of a form when the outward-folding screen is fully unfolded. The outward-folding screen may be folded along a folding edge according to directions 101*a* and 101*b* shown in (a) in FIG. 1, to form a first screen (or referred to as a main screen) and a second screen (or referred to as a back screen) shown in (b) in FIG. 1. The outward-folding screen may be further folded along the folding edge according to directions 102*a* and 102*b* shown in (b) in FIG. 1, to form the outward-folding screen in a folded state shown in (c) in FIG. 1. As shown in (c) in FIG. 1, after the foldable screen of the electronic device 100 is fully folded, the first screen faces away from the second screen, and the first screen and the second screen are visible to a user.

It may be understood that, for the electronic device having the outward-folding screen, when the foldable screen is in a folded state, an interface may be displayed on the first screen or the second screen; and when the foldable screen is in an unfolded state, an interface may be displayed on the first screen and the second screen. For descriptions of the unfolded state and the folded state of the foldable screen, refer to descriptions in the following embodiments. Details are not described herein.

Generally, a value range of an included angle $\alpha$ between the first screen and the second screen of the foldable screen (for example, the outward-folding screen) is [0°, 180°]. In this embodiment of this application, if $\alpha \in [0°, P]$, the electronic device may be determined that the foldable screen is in the folded state; and if $\alpha \in [P, 180°]$, electronic device may be determined that the foldable screen is in the unfolded state. Alternatively, if $\alpha \in [0°, P)$, the electronic device may determine that the foldable screen is in the folded state; and if $\alpha \in [P, 180°]$, the electronic device may determine that the foldable screen is in the unfolded state, where P is a preset angle threshold. P may be determined according to use habits of using the foldable screen by most users. Alternatively, P may be set by the user on the electronic device.

In some embodiments, according to the use habits of most users, when the included angle $\alpha$ between the first screen and the second screen is greater than 90°, it is highly possible that the user wants to use the first screen and the second screen as a whole (that is, as a complete display). Therefore, the preset angle threshold P in this embodiment of this application may be greater than 90°. A value range of the preset angle threshold P may be (0°, 180°). For example, the preset angle threshold P may be 100°, 120°, 135°, 140°, or 150°.

It should be noted that the at least two screens formed after the foldable screen in this embodiment of this application is folded may be a plurality of screens that exist independently, or may be a complete screen of an integrated structure that is folded into at least two parts.

For example, the foldable screen may be a flexible foldable screen. The flexible foldable screen includes a folding edge made of a flexible material. The flexible foldable screen is partially or entirely made of a flexible material. The at least two screens formed after the flexible foldable screen is folded are a complete screen of an integrated structure that are folded into at least two parts.

For another example, the foregoing foldable screen may be a multi-screen foldable screen. The multi-screen foldable screen may include a plurality of (two or more) screens. The plurality of screens are a plurality of separate screens. The plurality of screens may be successively connected by using a folding shaft. Each screen may rotate around a folding shaft connected to the screen, to implement folding of the multi-screen foldable screen.

FIG. 1 shows an example in which the foldable screen is a flexible foldable screen, to describe the foldable screen in this embodiment of this application. In addition, in a subsequent embodiment of this application, that the foldable screen is a flexible foldable screen is also used as an example to describe the method provided in embodiments of this application.

For example, the foregoing electronic device 100 is a mobile phone. For example, as shown in FIG. 1, the mobile phone includes a foldable screen 103 and a rear housing 104. The rear housing 104 includes a side cover 105 (or referred to as a side frame). A camera 105*a*, a flash 105*b*, a button 105*c* (such as a volume button, a power button, and a fingerprint unlock button) may be disposed on the side cover 105. Alternatively, another control may be disposed on the side cover 105. This is not limited.

As shown in FIG. 1, a camera 106 is further disposed on the foldable screen 103 of the mobile phone, and the camera 106 is disposed on a side that is of the foldable screen 103 and that is close to the side cover 105. For example, in this embodiment of this application, the camera 105*a* may be referred to as a rear-facing camera, and the camera 106 may be referred to as a front-facing camera.

(a) in FIG. 1 is a diagram of a form when the mobile phone is fully unfolded. For example, the mobile phone may be folded along the folding edge according to the directions 101*a* and 101*b* shown in (a) in FIG. 1, to form the mobile phone in the folded state shown in (b) in FIG. 1. After the foldable screen of the mobile phone is fully folded, the foldable screen 103 of the mobile phone includes the main screen and the back screen. In this embodiment of this application, when the mobile phone is in the folded state, a display on a same side as the front-facing camera 106 may be referred to as the main screen, and a display on a same side as the rear-facing camera 105*a* may be referred to as the back screen.

For example, as shown in (b) in FIG. 1, after the foldable screen of the mobile phone is folded, the back screen in the foldable screen is flush with the side cover 105, and the back screen faces away from the main screen. In addition, after the foldable screen of the mobile phone is folded, a size of the back screen in the foldable screen is less than a size of the main screen. In some embodiments, a sum of the size of the back screen and a size of the side cover 105 is similar to or equal to the size of the main screen.

In some embodiments, regardless of whether the electronic device is in the folded state or a non-folded state, in a scenario in which an always on display function of the electronic device is enabled, when it is detected that the electronic device is in an "inverted state", the electronic device automatically disables the always on display function. To be specific, the foldable screen (the main screen and the back screen) of the electronic device is in a screen-off state and does not display any content, to reduce power consumption of always on display of the electronic device.

In some other embodiments, in a scenario in which the electronic device is in the folded state, and the always on display function of the electronic device is enabled, the electronic device displays an always on display interface on the main screen. When it is detected that the electronic device is in a "back screen upward state", the electronic device displays an always on display interface on the back screen, to improve user experience.

For ease of understanding, embodiments of this application describe the terms: the "inverted state" and the "back screen upward state" in embodiments of this application with reference to the accompanying drawings.

In some embodiments of this application, that the electronic device is in the "inverted state" means that the screen of the electronic device faces downward, and the screen is in contact with an object surface (for example, a desktop). It should be understood that, when the display of the electronic device is a non-foldable screen, that the electronic device is in the inverted state means that the display of the electronic device faces downward and is in contact with the object surface. When the display of the electronic device is an outward-folding screen, the inverted state of the electronic device means that the main screen in the outward-folding screen of the electronic device faces downward and is in contact with the object surface.

Figure 2:
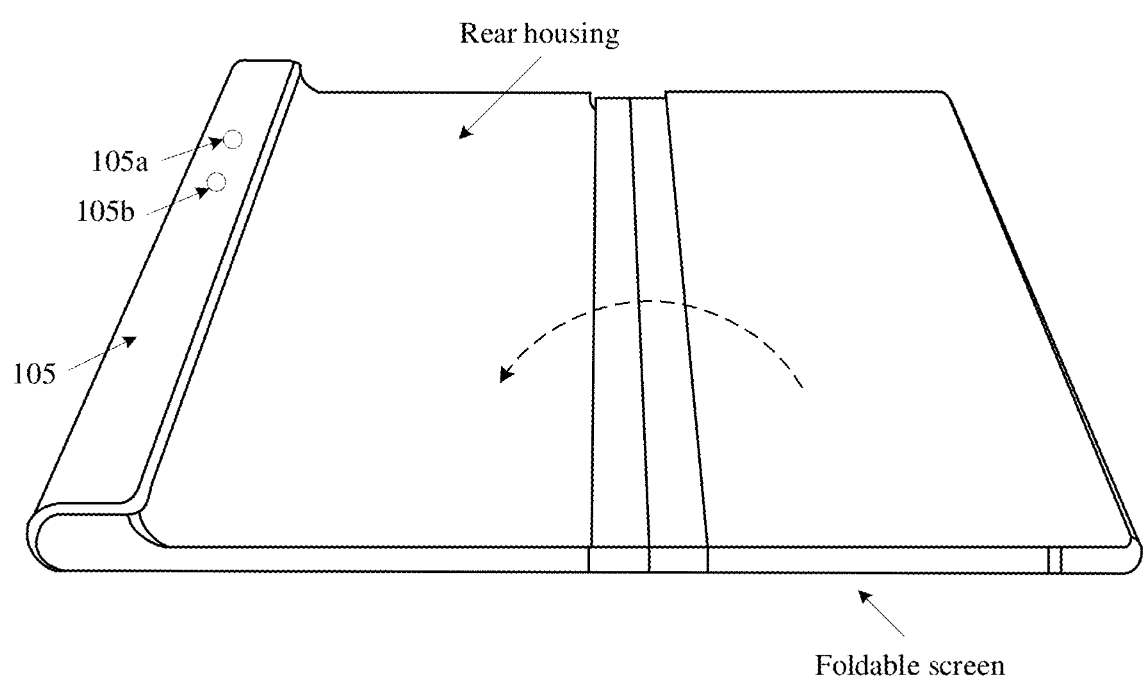
FIG. 2 is a diagram of a foldable screen in an unfolded state according to an embodiment of this application.

For example, the mobile phone shown in FIG. 2 is in the non-folded state (that is, the unfolded state). In this case, the foldable screen of the mobile phone faces downward, and the rear housing faces upward. When the foldable screen of the mobile phone is unfolded and is in the "inverted state", after the mobile phone enters an always on display state, the foldable screen of the mobile phone is screen-off.

Figure 3:
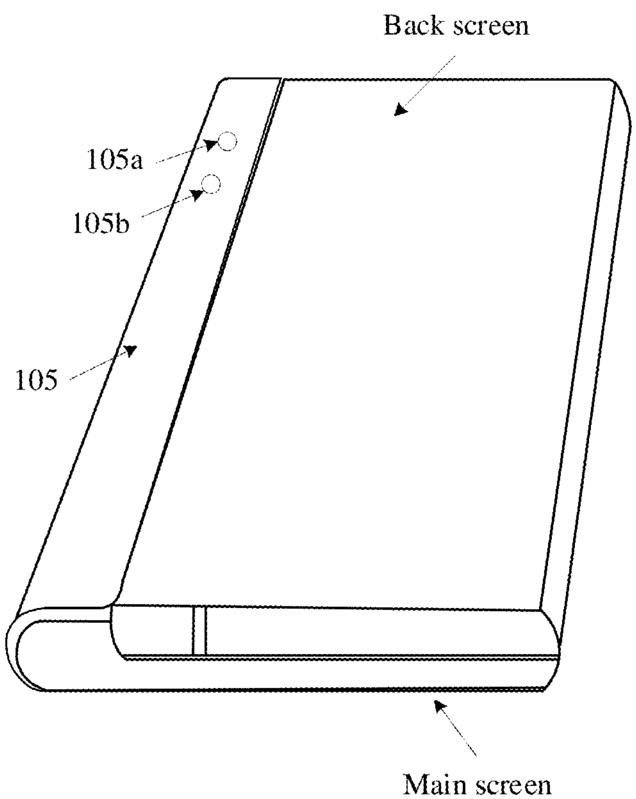
FIG. 3 is a diagram of a foldable screen in a folded state according to an embodiment of this application.

For another example, the mobile phone shown in FIG. 3 is in the folded state. In this case, the main screen of the mobile phone faces downward, and the back screen faces upward. In other words, a state shown in FIG. 3 may be the "inverted state", or may be the "back screen upward state". After the mobile phone enters the always on display state, if the mobile phone is in the "inverted state", the main screen and the back screen of the mobile phone are both screen-off. If the mobile phone is in the "back screen upward state", the back screen of the mobile phone displays an always on display interface, and the main screen is screen-off.

In this embodiment of this application, "downward" and "upward" are two opposite directions. For example, "downward" means a direction the same as a direction of gravity, and "upward" means a direction opposite to the direction of gravity. For example, that the main screen faces upward and the back screen faces downward means that a direction of the main screen is opposite to the direction of gravity and a direction of the back screen is the same as the direction of gravity. Correspondingly, that the main screen faces downward and the back screen faces upward means that the direction of the main screen is the same as the direction of gravity and the direction of the back screen is opposite to the direction of gravity.

In some embodiments, it may be determined, based on an included angle between the screen and a horizontal plane, whether the electronic device is in the "inverted state" or the "back screen upward state". The angle between the screen and the horizontal plane means an included angle between a display plane of the screen and the horizontal plane. Optionally, it may be determined, based on an included angle between an upper surface of the screen and the horizontal plane, whether the electronic device is in the "inverted state" or the "back screen upward state".

For example, the included angle between the screen and the horizontal plane is $\varphi$. If $\varphi \in [-M°, +M°]$, the electronic device may determine that the electronic device enters the "back screen upward state". If $\varphi \in [-N°, +N°]$, the electronic device may determine that the electronic device exits the "back screen upward state". Herein, M and N are preset angle thresholds, and M and N may be preconfigured in the electronic device. For example, M may be greater than 5° and less than 15°. For example, M may be 8°, 10°, or 12°. For example, N may be greater than 10° and less than or equal to 15°. For example, N may be 15°.

Figure 4:
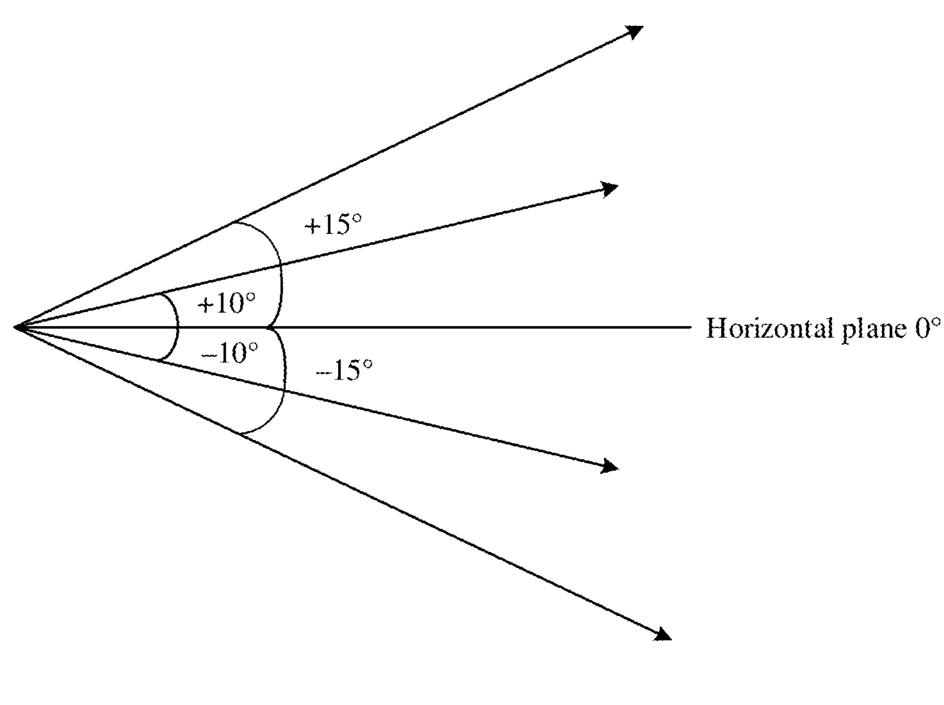
FIG. 4 is a diagram of an included angle between a screen and a horizontal plane according to an embodiment of this application.

For example, M is 10° and Nis 15°. In this case, as shown in FIG. 4, if $\varphi \in [-10°, +10°]$, the electronic device may determine that the electronic device enters the "back screen upward state"; and if $\varphi \in [-15°, +15°]$, the electronic device may determine that the electronic device exits the "back screen upward state".

For another example, if $\varphi \in [-m°, +m°]$, the electronic device may determine that the electronic device enters the "inverted state"; and if $\varphi \in [-n°, +n°]$, the electronic device may determine that the electronic device exits the "inverted state". Herein, m and n are preset angle thresholds, and m and n may be preconfigured in the electronic device. For example, m may be greater than 0° and less than or equal to 2°. For example, m may be 1° or 2°. For example, n may be greater than or equal to 5° and less than 10°. For example, n may be 5° or 6°.

For example, m is 2° and n is 5°. In this case, if $\varphi \in [-2°, +2°]$, the electronic device may determine that the electronic device enters the "inverted state"; and if $\varphi \in [-5°, +5°]$, the electronic device may determine that the electronic device exits the "inverted state".

It may be learned that, in this embodiment of this application, when the electronic device is in the folded state, the "inverted state" is essentially similar to the "back screen upward state". The always on display function needs to be disabled in the "inverted state", and an always on display interface needs to be displayed on the back screen in the "back screen upward state". There is a conflict between the two states. In a scenario in which the electronic device is in the folded state and the always on display function is enabled, if the electronic device satisfies both the "inverted state" and the "back screen upward state", it is possible that the back screen cannot display the always on display interface, or the back screen flickers when displaying the always on display interface.

In a related technology, when the foldable screen is in the folded state, in a scenario in which the always on display function of the electronic device is enabled, when the main screen of the electronic device faces downward and the back screen faces upward, the electronic device satisfies both the "back screen upward state" and the "inverted state". On this basis, a first processor of the electronic device reports both information indicating "back screen upward" and information indicating "inverted" to a second processor.

A duration that is determined by the electronic device through calculation and in which the electronic device is in the inverted state is relatively short, and a duration that is determined by the electronic device through calculation and in which the electronic device is in the back screen upward state is relatively long. For example, the duration that is determined by the electronic device through calculation and in which the electronic device is in the inverted state is 100 ms, and the duration that is determined by the electronic device through calculation and in which the electronic device is in the back screen upward state is 300 ms. Therefore, if the electronic device satisfies both the "back screen upward state" and the "inverted state", the first processor of the electronic device first reports the information indicating "inverted" and then reports the information indicating "back screen upward" to the second processor.

In this way, after the second processor of the electronic device receives the information indicating "inverted", the second processor of the electronic device disables the always on display function in response to the information indicating "inverted". In other words, the main screen and the back screen of the electronic device are both screen-off and do not display any content (this process may be referred to as a screen power-off operation). After the second processor of the electronic device receives the information indicating "back screen upward", in response to the information indicating "back screen upward", the second processor of the electronic device lights up a partial area of the back screen, and the back screen displays the always on display interface (this process may be referred to as a screen power-on operation).

It may be understood that, because the electronic device first disables the always on display function and then lights up the back screen, that is, the electronic device first performs the screen power-off operation and then performs a screen power-on operation, it is possible that the back screen cannot be lit up, or the back screen flickers when displaying the always on display interface due to a long response time for lighting-up of the back screen. This reduces performance of the electronic device and affects user experience.

To resolve the foregoing problem, embodiments of this application provide an always on display method, to resolve a problem that there is a conflict between the "inverted state" and the "back screen upward state" of the electronic device. The outward-folding screen is used as an example. When the foldable screen is in the folded state, in a scenario in which the always on display function of the electronic device is enabled, in response to a flip operation of the electronic device, the main screen of the electronic device faces downward, the back screen faces upward, and the first processor of the electronic device reports the information indicating "back screen upward" to the second processor and does not report the information indicating "inverted". Then, the electronic device displays the always on display interface on the back screen in response to the information indicating "back screen upward".

The first processor is different from the second processor. For example, the first processor may be an application processor (application processor, AP) of the electronic device, and the second processor may be a coprocessor. For example, the coprocessor may be an audio digital signal processor (audio digital signal processor, ADSP), and a sensor hub (Sensor Hub) may be configured on the second processor.

A main function of the sensor hub is to receive and process data from each sensor. For example, when an AP sleeps, the sensor hub may implement control on a sensor module, thereby reducing power consumption. In addition, the sensor hub may fuse different types of sensor data, to improve status detection for the electronic device.

Optionally, the sensor hub may sense a status of the electronic device, for example, the screen of the electronic device faces upward/downward. Optionally, the sensor hub may further sense a gesture of the user, for example, flipping the electronic device, knocking the electronic device, shaking the electronic device, and picking up/putting down the electronic device. Alternatively, the sensor hub may sense that the electronic device is on a table/in a pocket/on a hand of a user. Alternatively, the sensor hub may further sense a status of a user, such as a user's state of running, walking, standing, or sitting down. Certainly, the sensor hub may further sense another state. Details are not described.

In this embodiment of this application, the sensor hub may be configured to detect the status of the electronic device, such as the "inverted state", the "back screen upward state", and a state of "flipping an electronic device", and report the detected state of the electronic device to the AP.

The following describes implementations of embodiments of this application in detail with reference to the accompanying drawings.

For example, the always on display method provided in embodiments of this application may be applied to an electronic device including the foregoing foldable screen, such as a mobile phone, a tablet computer, a desktop computer, a laptop computer, a handheld computer, a notebook computer, an ultra-mobile personal computer (UMPC), a netbook, a cellular phone, a personal digital assistant (PDA), or an augmented reality (AR)/virtual reality (VR) device. A specific form of the electronic device is not particularly limited in embodiments of this application.

Figure 5:
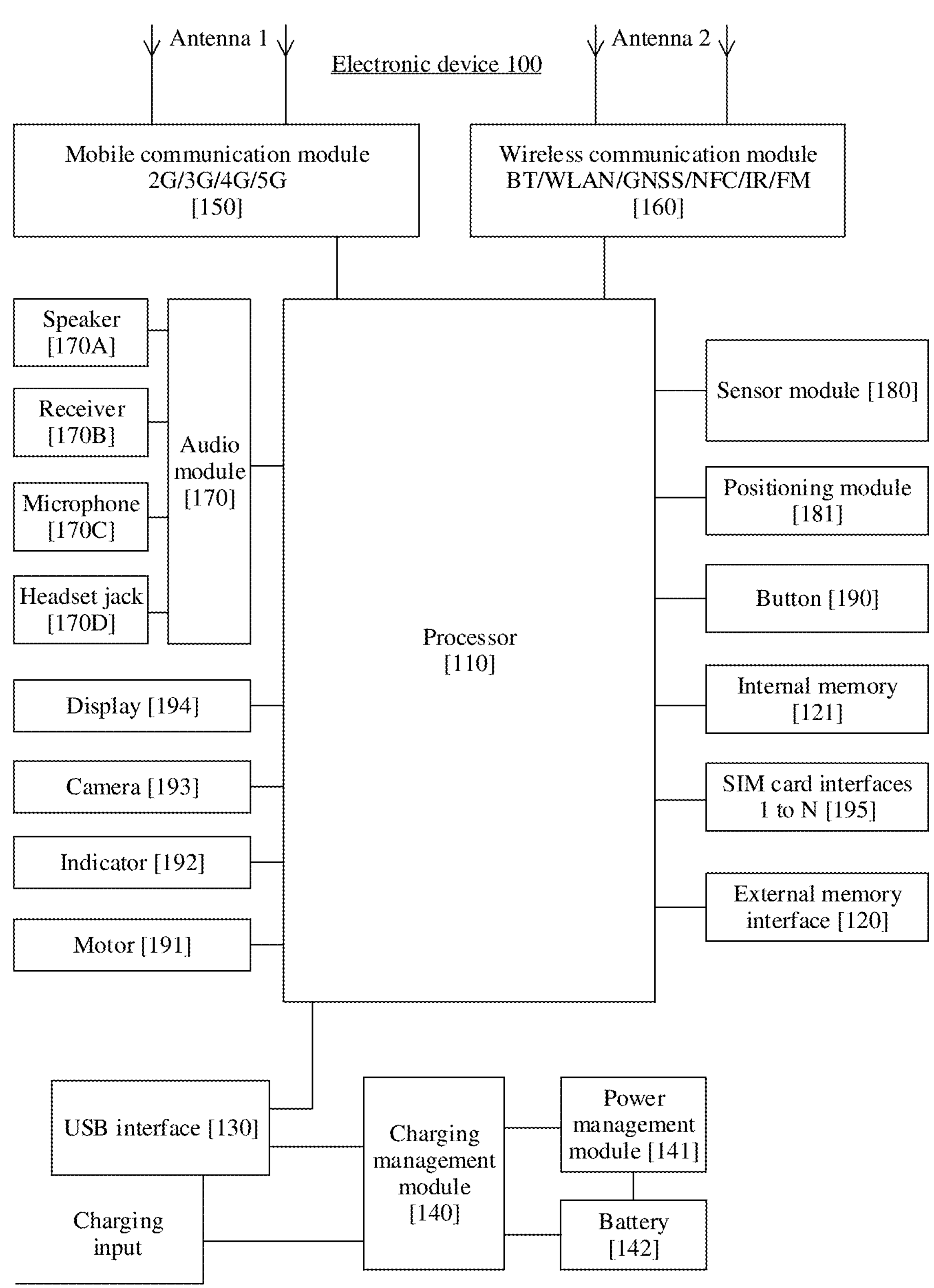
FIG. 5 is a diagram of a hardware structure of an electronic device according to an embodiment of this application.

FIG. 5 is a diagram of a structure of an electronic device 100 according to an embodiment of this application. As shown in FIG. 5, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a positioning module 181, a button 190, a motor 191, an indicator 192, a camera 193, a display 194, a subscriber identity module (SIM) card interface 195, and the like.

The sensor module 180 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

For example, the electronic device 100 may use the sensors in the foregoing sensor module 180 to collect corresponding sensor data. For example, the electronic device 100 may use a GPS apparatus to obtain a location of a user. For another example, the electronic device 100 may use the acceleration sensor and a gravity sensor to obtain a step count of a user. For another example, the electronic device 100 may use the temperature sensor to obtain a temperature of an environment in which a user is located.

In this embodiment of this application, the electronic device 100 may obtain an included angle between the electronic device 100 and a horizontal plane by using the acceleration sensor, to determine a status of the electronic device 100 (for example, an inverted state and a back screen upward state). For example, the acceleration sensor may collect acceleration data (for example, an axial acceleration value and a direction) of the electronic device 100 in any direction, and transmit the acceleration data to the sensor hub of the electronic device. After receiving the acceleration data transmitted by the acceleration sensor, the sensor hub processes the acceleration data to determine the status of the electronic device 100.

It can be understood that the schematic structure in this embodiment does not constitute a specific limitation on the electronic device 100. In some other embodiments, the electronic device 100 may include more or fewer components than those shown in the figure, or some components may be combined, or some components may be split, or components may be arranged in different manners. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment is merely an example for description, and does not constitute a limitation on the structure of the electronic device 100. In some other embodiments, the electronic device 100 may alternatively use an interface connection manner different from those in the foregoing embodiments or a combination of a plurality of interface connection manners.

The charging management module 140 is configured to receive charging input from a charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input by using a wireless charging coil of the electronic device 100. The charging management module 140 may further supply power to the electronic device 100 by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, and the like. The power management module 141 may further be configured to monitor parameters such as a battery capacity, a battery cycle count, and a battery state of health (leakage and impedance). In some other embodiments, the power management module 141 may also be disposed in the processor 110. In some other embodiments, the power management module 141 and the charging management module 140 may be alternatively disposed in a same device.

The display 194 is configured to display an image, a video, and the like. The display 194 includes a display panel. The display panel may be a liquid crystal display (liquid crystal display, LCD), an organic light-emitting diode (OLED), an active-matrix organic light emitting diode (AMOLED), a flexible light-emitting diode (FLED), a mini-LED, a micro-OLED, a quantum dot light emitting diode (QLED), or the like.

In this embodiment of this application, the display 194 may be a foldable screen. A size of the folded foldable screen is similar to a size of a non-foldable screen, and a size of the foldable screen is in an unfolded state is far greater than the size of the non-foldable screen. When the user uses the electronic device 100 having the foldable screen, flexibility and portability of the electronic device 100 can be improved. In addition, when the foldable screen is in the unfolded state, impact on visual experience of the user from a limitation of the size of the non-foldable screen may be further reduced.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and send the electromagnetic wave to the modem processor for demodulation.

The mobile communication module 150 may further amplify a signal obtained after modulation by the modem processor, and convert an amplified signal into an electromagnetic wave for radiation through the antenna 1. In some embodiments, at least some functional modules of the mobile communication module 150 may be disposed in the processor 110. In some embodiments, at least some of the functional modules of the mobile communication module 150 may be disposed in a same device as at least some of modules of the processor 110.

The electronic device 100 may implement an audio function through the audio module 170, the speaker 170A, the receiver 170B, the microphone 170C, the headset jack 170D, the application processor, and the like, for example, implement music playing and audio recording.

The audio module 170 is configured to convert digital audio information into analog audio signal output, and is also configured to convert analog audio input into a digital audio signal. The audio module 170 may further be configured to encode and decode audio signals. The speaker 170A, also referred to as a "loudspeaker", is configured to convert an audio electrical signal into sound information. The receiver 170B, also referred to as "earpiece", is configured to convert an electrical audio signal into a sound signal. The microphone 170C, also referred to as a "mic" and a "mike", is configured to convert a sound signal into an electrical signal. The headset jack 170D is configured to connect to a wired headset.

The external memory interface 120 may be configured to connect to an external storage card such as a micro SD card, to expand a storage capability of the electronic device 100. The external storage card communicates with the processor 110 through the external memory interface 120, to implement a data storage function. For example, files such as audio and videos are stored in the external storage card.

The internal memory 121 may be configured to store computer-executable program code. The computer-executable program code includes instructions. The processor 110 runs the instructions stored in the internal memory 121, to perform various function applications and data processing of the electronic device 100. For example, in an embodiment of this application, the processor 110 may execute the instructions stored in the internal memory 121, and the internal memory 121 may include a program storage area and a data storage area.

The program storage area may store an operating system, an application program required by at least one function (for example, a sound playback function and an image display function), and the like. The data storage area may store data (for example, audio data and a phone book) created during use of the electronic device 100. In addition, the internal memory 121 may include a high-speed random access memory, and may further include a non-volatile memory, for example, at least one magnetic disk storage device, a flash storage device, or a universal flash storage (UFS).

The button 190 includes a power-on/off button, a volume button, and the like. The motor 191 may be configured to provide an incoming call vibration prompt, and may further be configured to provide a touch vibration feedback. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface to implement contact with and separation from the electronic device 100. The electronic device may support one or N SIM card interfaces, where N is a positive integer greater than 1. The SIM card interface 195 may support a Nano SIM card, a Micro SIM card, a SIM card, and the like. A plurality of cards may be all inserted into the same SIM card interface 195. The plurality of cards may be of a same type or may be of different types. The SIM card interface 195 may be compatible with different types of SIM cards. The SIM card interface 195 is also compatible with an external storage card. The electronic device 100 interacts with a network through a SIM card, to implement functions such as a call and data communication. In some embodiments, the electronic device 100 uses an eSIM, namely, an embedded SIM card. The eSIM card may be embedded in the electronic device 100 and cannot be separated from the electronic device 100.

The method in the following embodiment may be implemented by the electronic device 100 having the foregoing hardware structure.

The software system of the electronic device 100 may use a layered architecture, an event-driven architecture, a microkernel architecture, a micro service architecture, or a cloud architecture. In embodiments of this application, the software structure of the electronic device 100 is described by using an Android system with a layered architecture as an example.

Figure 6:
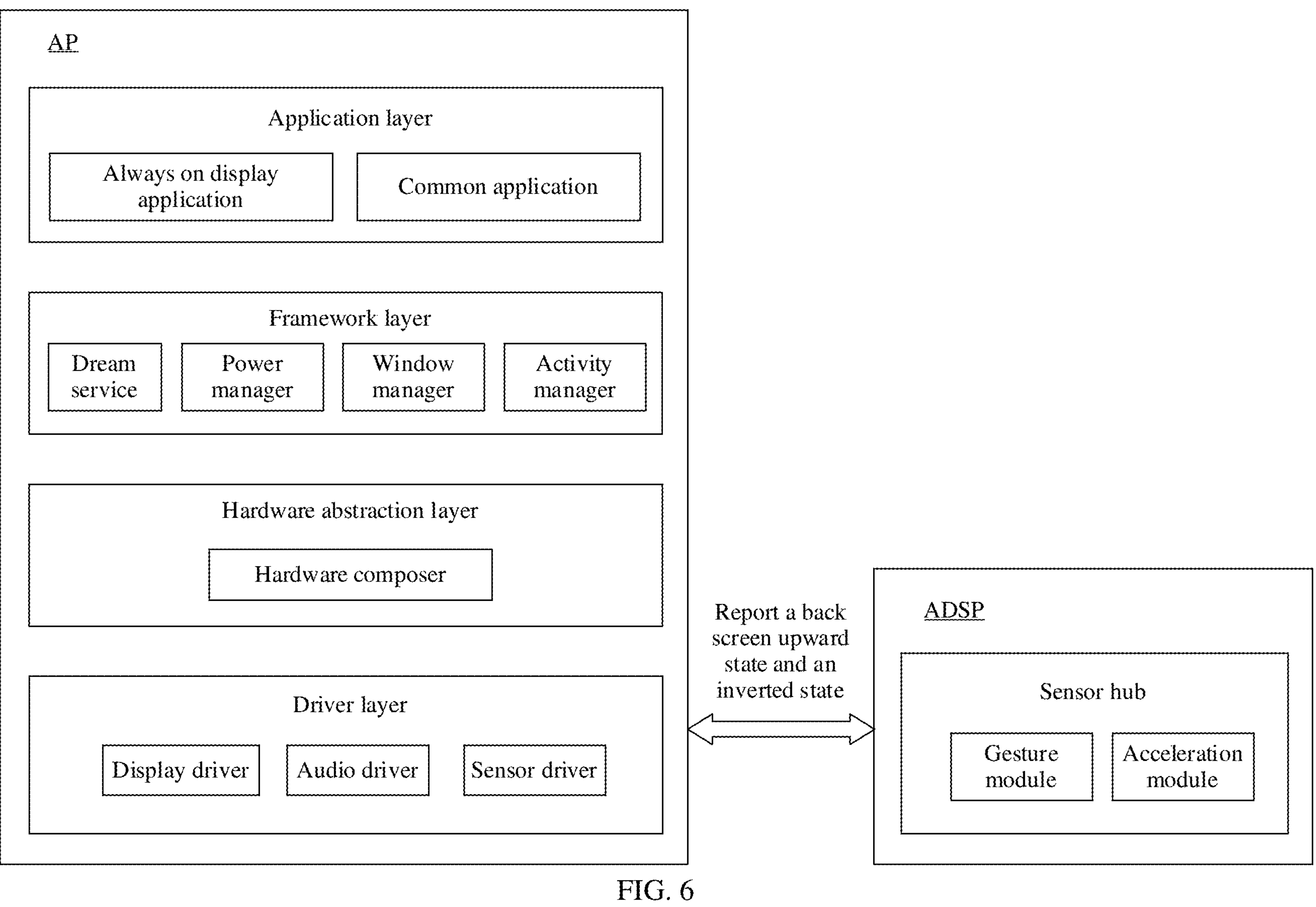
FIG. 6 is a diagram of a software framework of an electronic device according to an embodiment of this application.

FIG. 6 is a block diagram of a software structure of an electronic device 100 according to an embodiment of this application. In a layered architecture, software may be divided into several layers, and each layer has a clear role and task. Layers communicate with each other through a software interface. In some embodiments, an Android system is divided into four layers, that is, an application layer (application), an application framework layer (framework), a hardware abstraction layer (HAL), and a kernel layer (kernel, also referred to as a driver layer) from top to bottom.

The application layer may include a series of application program packages. For example, the application layer may include an always on display application and a common application. The common application may include applications (not shown in the figure) such as camera, library, calendar, phone, map, navigation, WLAN, Bluetooth, music, video, messages, and desktop launcher (launcher).

The always on display application is used to enable/disable an always on display function. When the always on display function is enabled by using the always on display application, the electronic device is triggered to light up a partial area of a screen, and display an always on display interface. When the always on display function is disabled by using the always on display application, the electronic device is triggered to be screen-off, and does not display any content.

The framework layer provides an application programming interface (API) and an application programming framework for an application in the application layer. The application framework layer includes some predefined functions. As shown in FIG. 6, the framework layer may include a dream service, a power manager service (PMS), a window manager (WMS), and an activity manager (AMS), and the like. Optionally, the framework layer may further include a content provider, a view system, a phone manager, a resource manager, a notification manager, and the like (not shown in the figure).

The dream service is used to register with and listen to the power manager, and enable the always on display application when detecting that the electronic device enters an always on display state.

The window manager is used to manage a window application. The window manager may obtain a size of a display, determine whether there is a status bar, perform screen locking, take a screenshot, and the like. The activity manager is responsible for managing an activity and is responsible for work such as starting, switching, and scheduling of components in the system, and management and scheduling of the applications.

The hardware abstraction layer may include a plurality library modules, and the library modules may be a hardware composer (hwcomposer, HWC), a camera library module, and the like. The Android system may load a corresponding library module for device hardware, thereby enabling the application framework layer to access the device hardware.

The kernel layer is a layer between hardware and software. The kernel layer includes at least a display driver, an audio driver, and a sensor driver.

In some embodiments of this application, the application layer, the framework layer, the hardware abstraction layer, and the kernel layer may be deployed in an application processor (AP). In other words, the AP controls modules in the foregoing software layers to execute corresponding functions. In some other embodiments of this application, the software framework of the electronic device may further include modules deployed in an audio digital signal processor (ADSP), and the ADSP controls modules to execute corresponding functions. For example, the ADSP may include a sensor hub. The sensor hub may obtain sensor data of each sensor, and determine a status of the electronic device with reference to the sensor data.

For example, as shown in FIG. 6, the sensor hub obtains acceleration data collected by the acceleration sensor, and determines a status of the electronic device based on the acceleration data. In an example, when the sensor hub determines that the status of the electronic device is the back screen upward state, the sensor hub reports the back screen upward state to the always on display application of the application layer through the kernel layer, the hardware abstraction layer, and the framework layer. After receiving the back screen upward state reported by the sensor hub, the always on display application executes a back screen always on display function, that is, displays an always on display interface on the back screen. In another example, when the sensor hub determines that the status of the electronic device is the inverted state, the sensor hub reports the inverted state to the always on display application of the application layer through the kernel layer, the hardware abstraction layer, and the framework layer. After receiving the inverted state reported by the sensor hub, the always on display application executes inverted screen-off logic. To be specific, both the main screen and the back screen are in a screen-off state and do not display any content.

Optionally, the ADSP may exchange information with the kernel layer by using a Qualcomm messaging interface (qualcomm messaging interface, QMI) or an IPC_Router, and transmit, to an AP side, the status that is of the electronic device and that is determined by the sensor hub.

In some embodiments, as shown in FIG. 6, the sensor hub may include an acceleration module and a gesture module (such as a motion). The acceleration module is configured to obtain the acceleration data (or referred to as ACC data) collected by the acceleration sensor, and report the acceleration data to the gesture module. The gesture module is further configured to determine the status of electronic device based on the acceleration data.

Optionally, the gesture module may further detect a gesture of the user, for example, a gesture of flipping the electronic device, a gesture of picking up/putting down the electronic device. This is not limited.

Figure 7:
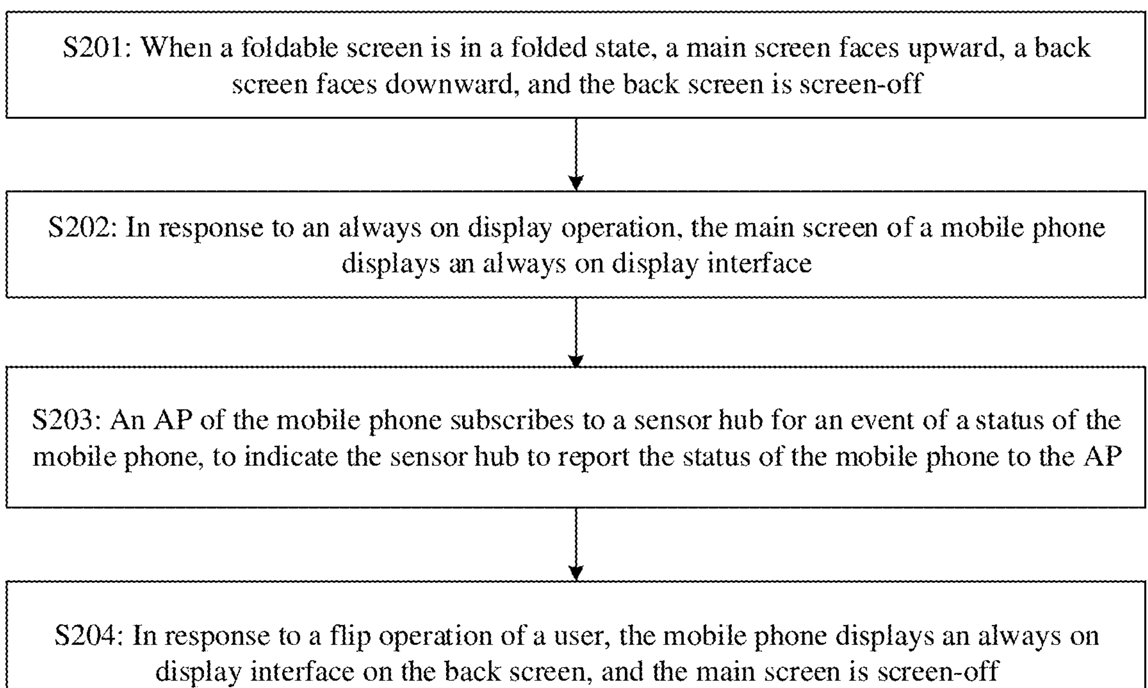
FIG. 7 is a schematic flowchart 1 of an always on display method according to an embodiment of this application.

The following uses an example in which the foregoing electronic device is the mobile phone, the foldable screen of the mobile phone is the foregoing outward-folding screen, and the outward-folding screen is capable of being folded into a first screen (for example, a main screen) and a second screen (for example, a back screen). The technical solutions provided in embodiments of this application are specifically described. As shown in FIG. 7, the always on display method may include S201 to S204.

S201: When the foldable screen is in a folded state, the main screen faces upward, the back screen faces downward, and the back screen is screen-off.

It may be understood that that the main screen faces upward means that a display orientation of the main screen is opposite to a direction of gravity, and that the back screen faces downward means that a display orientation of the back screen is the same as the direction of gravity. For descriptions of the main screen facing upward and the back screen facing downward, refer to the foregoing embodiment. Details are not described again.

Optionally, that the back screen is screen-off means that the back screen of the mobile phone generally does not display any content, so that an entire display area of the back screen of the mobile phone appears black. In some embodiments, all pixels included in the back screen are not lit up, making the back screen screen-off. In some other embodiments, all pixels included in the back screen are lit up, and the lit-up pixels are displayed in black.

S202: In response to an always on display operation, the main screen of the mobile phone displays an always on display interface.

For example, the mobile phone generates an always on display event in response to the always on display operation. For example, the always on display event may be an event of pressing a power button (that is, a power button) by a user when the mobile phone is screen-on. For another example, the always on display event may be an event in which the mobile phone does not detect a user operation within a specific time when the screen is on.

In some embodiments, the always on display interface may also be referred to as an AOD interface. The always on display interface displayed on the main screen of the mobile phone includes always on display information. The always on display information may include content such as time, incoming call information, and push messages. Certainly, the always on display information may further include other content. For example, the always on display information may further include an always on display animation, user usage data (for example, a step count and a heart rate of the user). Details are not described.

Figure 8:
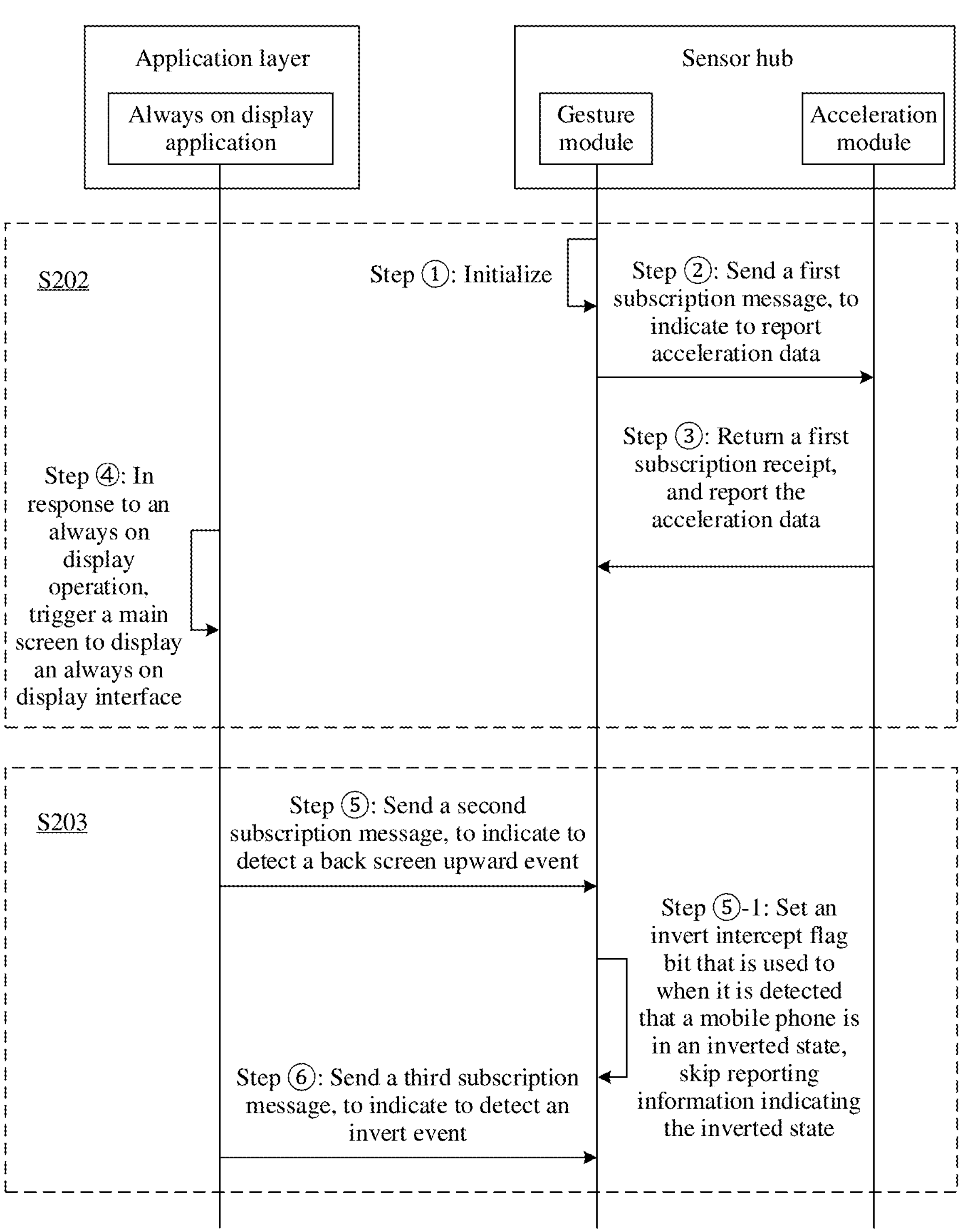
FIG. 8 is a schematic flowchart 2 of an always on display method according to an embodiment of this application.

For example, with reference to FIG. 6, as shown in FIG. 8, S203 may be specifically implemented in the following steps. For example, the application layer of the mobile phone includes the always on display application, and the sensor hub includes the gesture module and the acceleration module. S202 may specifically include step ① to step ④.

Step ①: Initialize the gesture module of the mobile phone.

For example, the mobile phone may initialize the gesture module after being powered on. Optionally, the mobile phone may initialize the gesture module when the mobile phone is first powered on. Alternatively, the mobile phone initializes the gesture module each time the mobile phone is powered on. This is not limited.

Initialization means restoring the gesture module to an initial setting or state. For example, each parameter configured for the gesture module is set to a predefined initial state.

Step ②: The gesture module of the mobile phone sends a first subscription message to the acceleration module, to indicate the acceleration module to report the acceleration data.

Step ③: The acceleration module of the mobile phone returns a first subscription receipt to the gesture module, and reports the acceleration data.

Optionally, in step ②, the gesture module of the mobile phone sends the first subscription message to the acceleration module, to indicate the acceleration module to report the acceleration data at a frequency of 100 Hz. Correspondingly, in step ③, the acceleration module of the mobile phone returns the first subscription receipt to the gesture module, and reports the acceleration data at the frequency of 100 Hz.

In some embodiments, step ② may also be replaced with a step in which the gesture module of the mobile phone sends a first registration message to the acceleration module, to indicate the acceleration module to report the acceleration data. Correspondingly, step ③ may also be replaced with a step in which the acceleration module of the mobile phone returns a first registration callback to the gesture module, and returns the acceleration data.

In this embodiment of this application, after step ① to step ③, the acceleration module continuously reports the acceleration data to the gesture module at the frequency of 100 Hz.

Optionally, step ① to step ③ may be performed before or after step 201, or during execution of step 202. Alternatively, step ① to step ③ may be performed after the mobile phone is powered on. This is not limited. In this embodiment of this application, description is provided by using an example in which step ① to step ③ performed during execution of step 202.

Step ④: In response to the always on display operation, the always on display application of the mobile phone triggers the main screen to display the always on display interface.

For example, with reference to FIG. 6, the dream service in the framework layer may register with and listen to the power manager, and enable the always on display application when detecting that the mobile phone enters an always on display state. Then, in response to the always on display operation, the always on display application triggers the main screen to display the always on display interface. Optionally, the always on display application may call a function (onDreamingStarted( )) to trigger the main screen to display the always on display interface. It may be understood that the back screen of the mobile phone in a folded state is screen-off.

For another example, when the mobile phone exits the always on display state, the dream service cancels registration with and listening to the power manager. For example, the dream service calls a function (onDreamingStop( )) to cancel registration with and listening to the power manager.

Optionally, in this embodiment of this application, in response to the always on display operation, the always on display application of the mobile phone enables a back screen always on display function. The back screen always on display function means that when the mobile phone is in a back screen upward state, the mobile phone displays an always on display interface on the back screen, and the main screen is screen-off.

S203: An AP of the mobile phone subscribes to the sensor hub for an event of a status of the mobile phone, to indicate the sensor hub to report the status of the mobile phone to the AP.

For example, in response to the always on display operation, the main screen is triggered to display the always on display interface, and the AP is triggered to subscribe to the sensor hub for a back screen upward event, to indicate the sensor hub to report, to the AP, information indicating the back screen upward state when determining that the mobile phone is in the back screen upward state. It may be understood that in this embodiment of this application, the sensor hub may continuously detect the status of the mobile phone, and report, to the AP, the information indicating the back screen upward state when determining that the mobile phone is in the back screen upward state.

After the AP of the mobile phone subscribes to the sensor hub for the back screen upward event, the AP of the mobile phone subscribes to the sensor hub for an invert event, to indicate the sensor hub to report, to the AP, information indicating the inverted state when determining that the mobile phone is in the inverted state. It may be understood that in this embodiment of this application, the sensor hub may continuously detect the status of the mobile phone, and when determining that the mobile phone is in the inverted state, report, to the AP, the information indicating the inverted state.

For example, still as shown in FIG. 8, S203 may specifically include step ⑤ and step ⑥.

Step ⑤: The always on display application of the mobile phone sends a second subscription message to the gesture module, to indicate the gesture module to report the back screen upward state.

Optionally, in response to the always on display operation, the always on display application of the mobile phone enables the always on display function, sends the second subscription message to the gesture module, and subscribes for a back screen upward event, that is, indicates the gesture module to report the back screen upward state. When the foldable screen is in the folded state, the always on display function is used to trigger the main screen to display the always on display interface. In the folded state, the back screen is screen-off.

For example, the always on display application of the mobile phone may call a function (enableMotionRotation( )) to send the second subscription message to the gesture module. Optionally, that the always on display application of the mobile phone sends the second subscription message to the gesture module may be replaced with a method (for example, extDeviceEventListener) in which the always on display application of the mobile phone registers with and listens to the gesture module, including listening to the back screen upward state.

Step ⑥: The always on display application of the mobile phone sends a third subscription message to the gesture module, to indicate the gesture module to report the inverted state.

For example, after the always on display application of the mobile phone subscribes to the gesture module for the back screen upward event, the always on display application of the mobile phone subscribes to the gesture module for the invert event, to indicate the gesture module to report the inverted state. On this basis, a mobile phone module of the mobile phone detects the status of the mobile phone, determines, based on the acceleration data, whether the mobile phone is in the inverted state, and when determining that the mobile phone is in the inverted state, reports, to the always on display application of the mobile phone, the information indicating the inverted state.

Optionally, in response to the always on display event, the always on display application of the mobile phone enables an inverted screen-off function, sends a third subscription message to the gesture module, and subscribes for the invert event, that is, indicates the gesture module to report the inverted state. The inverted screen-off function is used to indicate the mobile phone to trigger the screen of the mobile phone to be screen-off when the mobile phone is in the inverted state.

When the mobile phone is in an unfolded state, the inverted screen-off function is used to indicate to trigger the screen to be screen-off when the mobile phone is in the inverted state. This includes that both a main screen display area and a back screen display area are screen-off. When the mobile phone is in the folded state, the back screen is in the screen-off state, and the inverted screen-off function is used to indicate to trigger the main screen of the mobile phone to be screen-off when the mobile phone is in the inverted state.

For example, the always on display application of the mobile phone may call a function (onSetUp( )) to send the third subscription message to the gesture module. Optionally, that the always on display application of the mobile phone sends the third subscription message to the gesture module may be replaced with a method (for example, extDeviceEventListener) in which the always on display application of the mobile phone registers with and listens to the gesture module, including listening to the invert event.

In this embodiment of this application, step ⑤ is performed before step ⑥. To be specific, the always on display application of the mobile phone first subscribes to the gesture module for the back screen upward event, and then subscribes for the invert event. The reason is as follows: The gesture module detects that a duration in which the mobile phone is in the inverted state is relatively short (for example, 100 ms), and the gesture module detects that a duration in which the mobile phone is in the back screen upward state is relatively long (for example, 300 ms). If the always on display application of the mobile phone first subscribes to the gesture module for the invert event and then subscribes for the back screen upward event, after the mobile phone is flipped (that is, the main screen faces downward, and the back screen faces upward), the gesture module of the mobile phone first reports, to the always on display application, the information indicating the inverted state, and then reports the information indicating the back screen upward state. In this way, the always on display application of the mobile phone first performs a power-off operation, and then performs a power-on operation, so that the back screen cannot be lit up or a response time for which the back screen is lit up is long.

On this basis, in this embodiment of this application, the always on display application of the mobile phone first subscribes to the gesture module for the back screen upward event, and then subscribes for the invert event. In this way, after the mobile phone is flipped, the gesture module of the mobile phone first reports, to the always on display application, the information indicating the back screen upward state, to trigger the mobile phone to display the always on display interface on the back screen and the main screen to be screen-off. Correspondingly, if the gesture module of the mobile phone further reports, to the always on display application, the information indicating the inverted state, both the main screen and the back screen are triggered to be screen-off. It may be understood that in this case, the back screen always on display function of the mobile phone is in a disabled state, that is, back screen always on display logic of the mobile phone does not take effect.

Optionally, after each time the foldable screen of the mobile phone in the folded state enters the always on display state, the always on display application of the mobile phone subscribes to the gesture module for the back screen upward event and the invert event. In addition, in each subscription, the back screen upward event is subscribed first, and then the invert event is subscribed.

Optionally, after the foldable screen of the mobile phone in the folded state exits the always on display state, the always on display application of the mobile phone cancels subscription to the gesture module for the back screen upward event and the invert event, to reduce power consumption of the mobile phone. A sequence in which the always on display application of the mobile phone cancels subscription to the gesture module for the back screen upward event and the invert event is not limited.

Further, after step ⑤, S203 may further include: Step ⑤-1: The gesture module of the mobile phone sets an invert intercept flag bit (or referred to as a first flag bit) that is used to when the gesture module detects that the mobile phone is in the inverted state, skip reporting, to the always on display application of the mobile phone, the information indicating the inverted state.

Optionally, after receiving subscription of the always on display application for the back screen upward event, the gesture module of the mobile phone sets the invert intercept flag bit (cur_motion_type_back_screen) to true to indicate the gesture module not to report, to the always on display application, the information indicating the inverted state, that is, intercept the information indicating the inverted state.

Optionally, when the gesture module of the mobile phone sets the invert intercept flag bit (cur_motion_type_back_screen) to false, the gesture module is indicated to report, to the always on display application, the information indicating the inverted state.

S204: In response to a flip operation of the user, the mobile phone displays the always on display interface on the back screen, and the main screen is screen-off.

It may be understood that when the mobile phone is in the folded state, in response to the flip operation of the user, the main screen of the mobile phone faces downward, and the back screen faces upward.

Optionally, that the mobile phone displays the always on display interface on the back screen, and the main screen is screen-off includes that the mobile phone switches from the main screen to the back screen to display the always on display interface, and the main screen is screen-off.

Optionally, the sensor hub of the mobile phone reports, to the AP, the information indicating the back screen upward state, and does not report the information indicating the inverted state. Based on the information indicating the back screen upward state, the mobile phone displays the always on display interface on the back screen, and the main screen is screen-off.

In some embodiments, the user may set a plurality of display modes for the always on display function of the mobile phone, such as all-day display, timed display, or display upon touch. In the all-day display mode, when the mobile phone enters the always on display state at any time of a day, the foregoing always on display interface needs to be displayed. In the timed display mode, if the mobile phone enters the always on display state within a time range set by the user, the foregoing always on display interface needs to be displayed. For example, the user sets the always on display function to be enabled in the time range of 8:00-18:00. Then, after the mobile phone detects an always on display event, if current time is between 8:00 and 18:00, the foregoing always on display interface may be displayed after the mobile phone is in always on display. Otherwise, the mobile phone may enter the screen-off state. In the display upon touch mode, after the mobile phone enters the always on display state, the foregoing always on display interface is displayed in fixed time. If a touch operation of the user is not detected, the mobile phone may stop displaying the foregoing always on display interface and enter the screen-off state. Correspondingly, if a touch operation of the user is detected in the screen-off state, the mobile phone may display the foregoing always on display interface again.

For example, when the display mode of the always on display function is all-day display, after the mobile phone switches from the main screen to the back screen to display the always on display interface, the foregoing always on display interface needs to be displayed when the back screen of the mobile phone enters the always on display state all-day.

For another example, when the display mode of the always on display function is timed display, after the mobile phone switches from the main screen to the back screen to display the always on display interface, if the current time is within the time range set by the user, the mobile phone displays the always on display interface on the back screen; or otherwise, the mobile phone enters the screen-off state.

For another example, when the display mode of the always on display function is display upon touch, after the mobile phone enters the always on display state, the always on display interface is displayed in fixed time. For example, each time after the mobile phone enters the always on display state, a time of displaying the always on display interface is 6 seconds. It is assumed that when a duration in which the mobile phone displays the always on display interface on the main screen is 3 seconds, the main screen is switched to the back screen to display the always on display interface, and the duration of displaying the always on display interface on the back screen is also 3 seconds. After the back screen detects the touch operation of the user, a duration of displaying the always on display interface on the back screen is 6 seconds.

Figure 9:
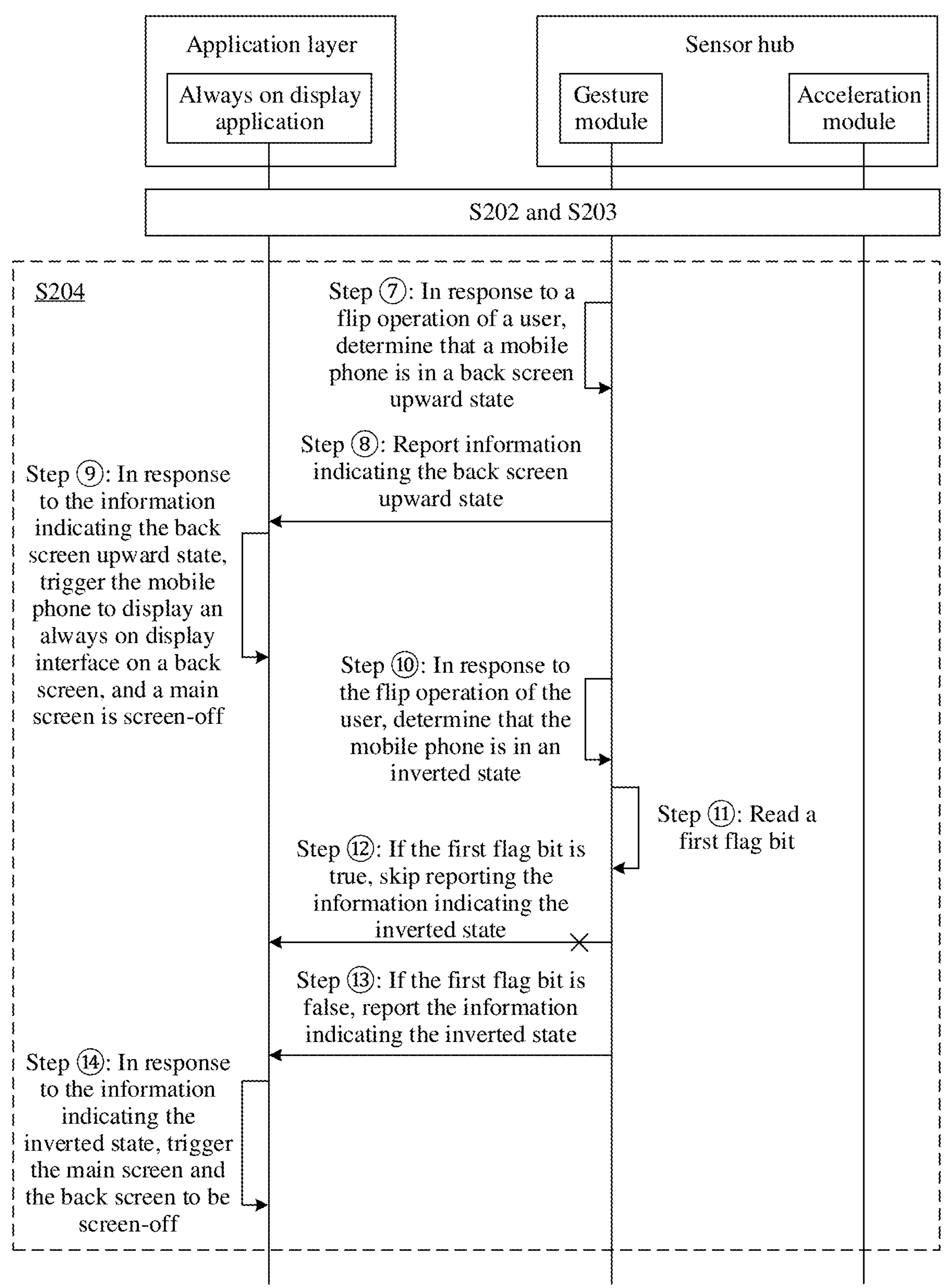
FIG. 9 is a schematic flowchart 3 of an always on display method according to an embodiment of this application.

For example, as shown in FIG. 9, S204 may specifically include step ⑦ to step ⑭.

Step ⑦: In response to the flip operation of the user, the gesture module of the mobile phone determines that the mobile phone is in the back screen upward state.

Optionally, the gesture module of the mobile phone may detect the status of the mobile phone. After detecting that the mobile phone is flipped, the gesture module of the mobile phone determines, based on the acceleration data, that the mobile phone is in the back screen upward state.

It should be understood that because the always on display application of the mobile phone first subscribes to the gesture module for the back screen upward event, after the gesture module of the mobile phone detects that the mobile phone is flipped, the gesture module first determines, based on the acceleration data, whether the mobile phone is in the back screen upward state.

Optionally, the acceleration module of the mobile phone calls a function (handle_acc_data) to return a second subscription receipt to the gesture module and report the acceleration data. Then, the gesture module of the mobile phone calls a function (back_screen_up_mode(&acc_data, &direction, this)) to calculate an included angle between the screen of the mobile phone and a horizontal plane, to determine whether the mobile phone is in the back screen upward state.

For example, if the included angle that is between the display of the mobile phone and the horizontal plane and that is calculated by the gesture module of the mobile phone is within a range of [−10°, +10°], the gesture module of the mobile phone may determine that the mobile phone is in the back screen upward state.

To improve accuracy of determining that the mobile phone is in the back screen upward state, in some embodiments, the gesture module of the mobile phone may calculate the included angle between the display of the mobile phone and the horizontal plane based on acceleration data of consecutive Z frames. If the included angle that is between the display of the mobile phone and the horizontal plane and that is calculated by the gesture module of the mobile phone based on the acceleration data of the consecutive Z frames is within the range of [−10°, +10°], the gesture module of the mobile phone determines that the mobile phone is in the back screen upward state.

Correspondingly, if the included angle that is between the display of the mobile phone and the horizontal plane and that is calculated by the gesture module of the mobile phone based on the acceleration data of the consecutive Z frames is within a range of [−15°, +15°], the gesture module of the mobile phone may determine that the mobile phone exits the back screen upward state.

It should be noted that a value of Z may be set according to an actual requirement. This is not limited. For example, Z may be 30 frames, 40 frames, or 50 frames.

Step ⑧: The gesture module of the mobile phone reports, to the always on display application, the information indicating the back screen upward state.

For example, the information indicating the back screen upward state may be expressed as: motion=18, to indicate that the mobile phone is in the back screen upward state.

Optionally, the gesture module of the mobile phone may call an interface (pb_send_sensor_stream_event) to report, to the always on display application, the information indicating the back screen upward state, that is, report motion=18.

Step ⑨: In response to the information indicating the back screen upward state, the always on display application of the mobile phone triggers the mobile phone to display the always on display interface on the back screen, and the main screen is screen-off.

Optionally, the always on display application of the mobile phone enables the back screen always on display function in response to the information indicating the back screen upward state. The back screen always on display function is used to indicate the mobile phone to display the always on display interface on the back screen and make the main screen screen-off.

In some embodiments, after step ⑨, step S204 may further include: Step ⑩: In response to the flip operation of the user, the gesture module of the mobile phone determines that the mobile phone is in the inverted state.

It should be understood that because the always on display application of the mobile phone first subscribes to the gesture module for the back screen upward event and then subscribes for the invert event, after the gesture module of the mobile phone determines that the mobile phone is in the back screen upward state, the gesture module further determines, based on the acceleration data, whether the mobile phone is in the inverted state.

Optionally, the acceleration module of the mobile phone calls a function (handle_acc_data) to return a third subscription receipt to the gesture module and report the acceleration data. Then, the gesture module of the mobile phone calls a function (handle_head_down_with_als_type) to calculate the included angle between the display of the mobile phone and the horizontal plane, to determine whether the mobile phone is in the inverted state.

For example, if the included angle that is between the display of the mobile phone and the horizontal plane and that is calculated by the gesture module of the mobile phone is within a range of [−2°, +2°], the gesture module of the mobile phone may determine that the mobile phone is in the inverted state.

Optionally, the gesture module of the mobile phone may calculate the included angle between the display of the mobile phone and the horizontal plane based on the acceleration data of the consecutive Z frames. If the included angle that is between the display of the mobile phone and the horizontal plane and that is calculated by the gesture module of the mobile phone based on the acceleration data of the consecutive Z frames is within the range of [−2°, +2°], the gesture module of the mobile phone determines that the mobile phone is in the inverted state, to improve accuracy of determining that the mobile phone is in the inverted state.

Correspondingly, if the included angle that is between the display of the mobile phone and the horizontal plane and that is calculated by the gesture module of the mobile phone based on the acceleration data of the consecutive Z frames is within a range of [−5°, +5°], the gesture module of the mobile phone may determine that the mobile phone exits the inverted state.

Step ⑪: The gesture module of the mobile phone reads the first flag bit.

Optionally, the first flag bit may be expressed as (cur_motion_type_back_screen). If the first flag bit is true, it indicates that the gesture module does not report, to the always on display application, the information indicating the inverted state. If the first flag bit is false, it indicates that the gesture module reports, to the always on display application, the information indicating the inverted state.

Step ⑫: If the first flag bit is true, it indicates that the gesture module does not report, to the always on display application, the information indicating the inverted state.

For example, when the gesture module of the mobile phone determines that the mobile phone is in the inverted state, and the always on display application of the mobile phone subscribes to the gesture module for the back screen upward event, the gesture module of the mobile phone does not report the information indicating the inverted state to the always on display application, and detects the status of the mobile phone based on the acceleration data. For example, the gesture module of the mobile phone returns to previous logic, calls a function (back_screen_up_mode (&acc_data, &direction, this)), and detects the status of the mobile phone.

Optionally, each time the gesture module of the mobile phone determines that the mobile phone is in the inverted state, the gesture module of the mobile phone reads the first flag bit, and determines whether the first flag bit is true.

In this embodiment of this application, because the always on display application of the mobile phone first subscribes to the gesture module for the back screen upward event and then subscribes for the back screen upward event, the invert intercept flag bit is set to the first flag bit. In this way, when the gesture module of the mobile phone determines that the mobile phone is in the inverted state, if the first flag bit is true, the gesture module of the mobile phone does not report, to the always on display application, the information indicating the inverted state. In this case, the gesture module of the mobile phone does not report, to the always on display application, the information indicating the back screen upward state and the information indicating the inverted state. As a result, the back screen cannot be lit up, or the back screen flickers when displaying the always on display interface due to a long response time for lighting-up of the back screen.

In some embodiments, S204 may further include: Step ⑬: If the first flag bit is false, the gesture module of the mobile phone reports, to the always on display application, the information indicating the inverted state.

For example, the information indicating the inverted state may be expressed as: motion=19, to indicate that the mobile phone is in the inverted state.

Optionally, the gesture module of the mobile phone may call the interface (pb_send_sensor_stream_event) to report, to the always on display application, the information indicating the inverted state, that is, report motion=19.

Step ⑭: In response to the information indicating the inverted state, the always on display application of the mobile phone triggers the main screen to be screen-off.

Optionally, in response to the information indicating the inverted state, the always on display application of the mobile phone executes the inverted screen-off logic to trigger the main screen to be screen-off. It may be understood that when the mobile phone is in the folded state, the back screen is screen-off. Therefore, when the mobile phone is in the folded state and in the inverted state, both the main screen and the back screen of the mobile phone are screen-off.

For example, the always on display application of the mobile phone may call a function (SendCommand), to execute the inverted screen-off logic (or referred to as a power-off operation).

It should be noted that the foregoing embodiment mainly describes a specific implementation in which the mobile phone enters the always on display state when the always on display function of the mobile phone is enabled and the back screen always on display function is enabled. It may be understood that, when the always on display function of the mobile phone is enabled and the always on display function of the back screen is disabled, and the sensor hub of the mobile phone determines that the mobile phone is in the inverted state, the sensor hub of the mobile phone reports, to the AP, the information indicating the inverted state, and does not report the information indicating the back screen upward state. The reason is as follows: When the back screen always on display function of the mobile phone is disabled, and the mobile phone does not display the always on display interface on the back screen even if the mobile phone determines that the mobile phone is in the back screen upward state, that is, the back screen always on display logic requires the mobile phone to enable the back screen always on display function, in a case in which the sensor hub of the mobile phone determines that the mobile phone is in the back screen upward state, the information indicating the back screen upward state is reported to the AP. Based on the information indicating the back screen upward state, the back screen displays the always on display interface, and the main screen is screen-off.

The foregoing solution mainly describes a specific implementation in which the foldable screen enters the always on display state in the folded state. With reference to the accompanying drawings, the following embodiments mainly describe a specific implementation in which the foldable screen changes from the unfolded state to the folded state and enters the always on display state.

Figure 10:
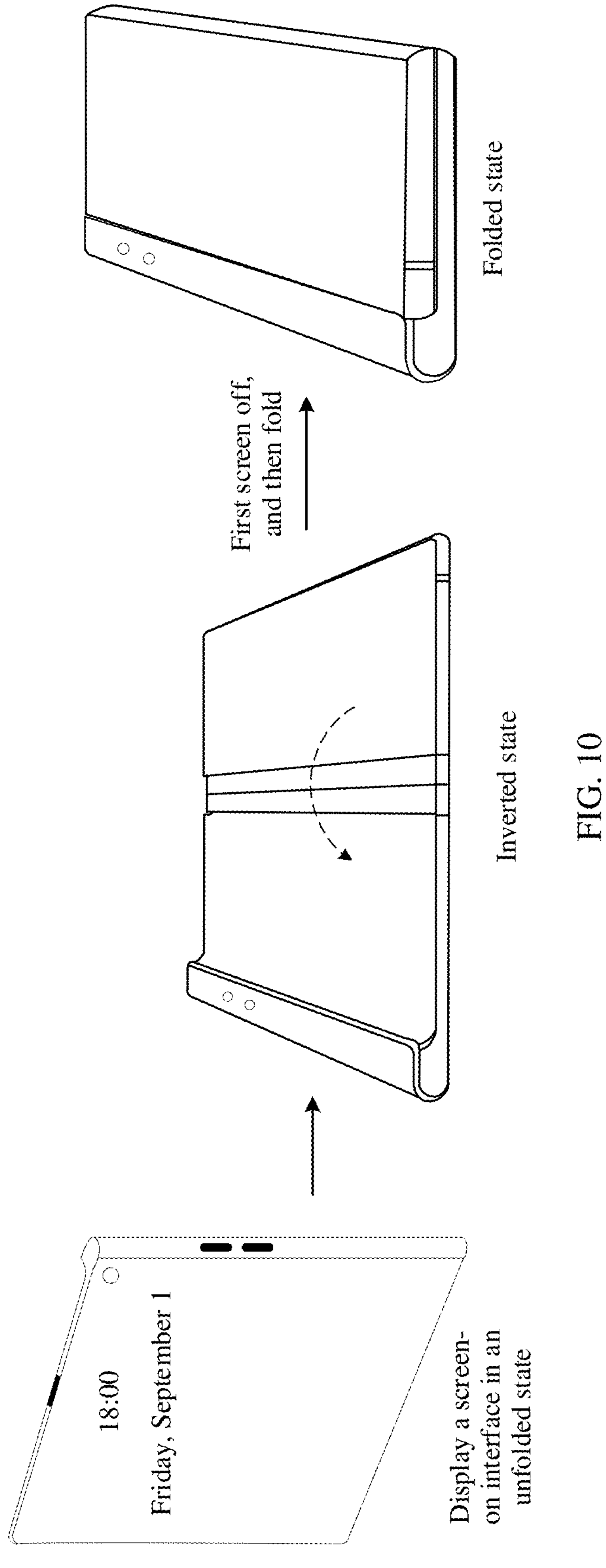
FIG. 10 is a diagram in which a foldable screen is switched from an unfolded screen-on state to a folded always on display state according to an embodiment of this application.

FIG. 10 is a diagram in which a foldable screen is switched from an unfolded state to a folded state. For example, the foldable screen of the mobile phone displays a screen-on interface in the unfolded state. In response to a flip operation of a user, the mobile phone is in an inverted state. Further, the mobile phone enters a screen-off state because the mobile phone is in the inverted state in response to an always on display operation of the user. In this scenario, after the foldable screen is switched from the unfolded state to the folded state, the back screen cannot be lit up, that is, the back screen cannot display an always on display interface.

To resolve the foregoing problem, an embodiment of this application further provides an always on display method. The method is applied to an electronic device having the foregoing foldable screen. The following problem can be resolved: After the electronic device in an inverted state enters an always on display state, and the foldable screen is switched to the folded state from the unfolded state, the back screen cannot be lit up.

Figure 11:
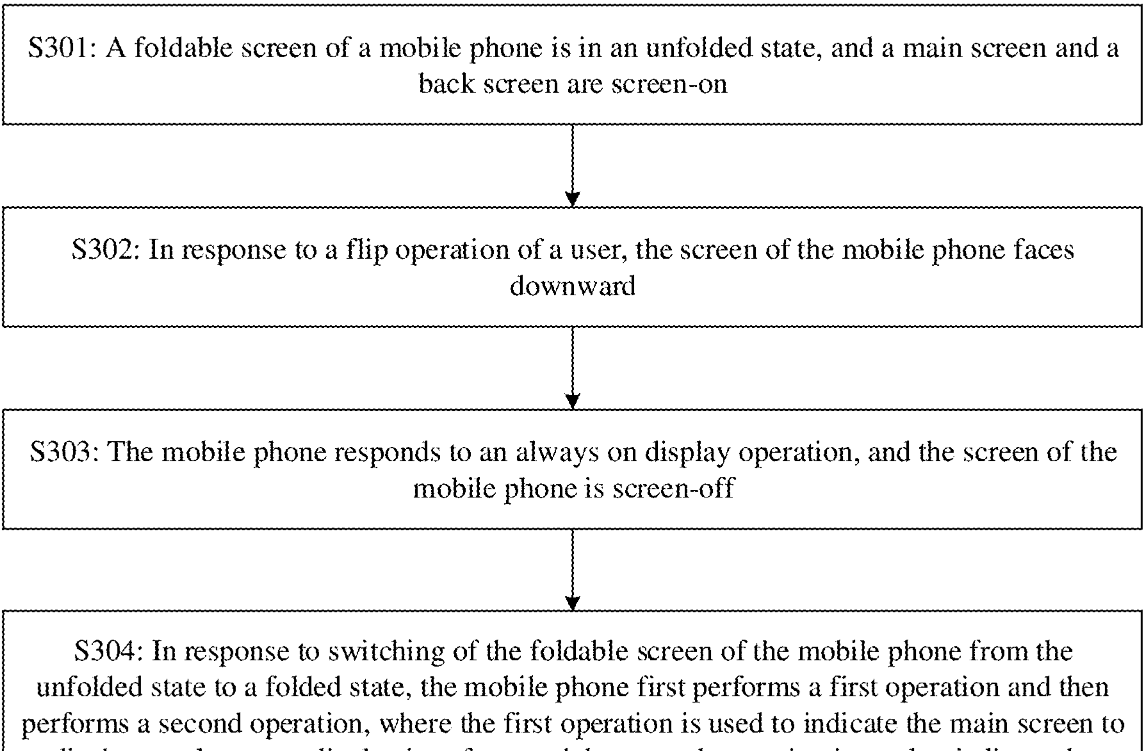
FIG. 11 is a schematic flowchart 4 of an always on display method according to an embodiment of this application.

The technical solutions provided in embodiments of this application are specifically described by still using an example in which the foregoing electronic device is a mobile phone, the foldable screen of the mobile phone is an outward-folding screen, and the outward-folding screen is capable of being folded into a first screen (for example, a main screen) and a second screen (for example, a back screen). As shown in FIG. 11, the always on display method may include S301 to S304.

S301: The foldable screen of the mobile phone is in the unfolded state, and the main screen and the back screen are screen-on.

For example, as shown in FIG. 10, when the foldable screen of the mobile phone is in the unfolded state, the main screen and the back screen of the mobile phone are screen-on. Screen-on means that an entire area of a display of the mobile phone is lit up. In an example, that the display of the mobile phone is screen-on includes that the mobile phone is in a lock screen state. In another example, that the display of the mobile phone is screen-on includes that the mobile phone is in an unlocked state.

FIG. 10 shows an example in which the mobile phone is in the lock screen state and displays a lock screen interface. It may be understood that when the mobile phone is in the unlocked state, the mobile phone may display an application interface (for example, a main interface, a video interface, and a chat interface).

S302: In response to a flip operation of the user, the screen of the mobile phone faces downward.

It may be understood that, when the mobile phone is in the unfolded state, after the mobile phone is flipped, the screen of the mobile phone faces downward. This includes that a main screen display area faces downward, and a back screen display area faces downward. For descriptions of the main screen facing downward and the back screen facing downward, refer to the foregoing embodiment. Details are not described again.

S303: The mobile phone responds to an always on display operation, and the screen of the mobile phone is screen-off.

It should be understood that in this scenario, after the mobile phone enters an always on display state, because the foldable screen of the mobile phone is in the unfolded state, and the mobile phone is in the inverted state, the mobile phone executes inverted screen-off logic to trigger the screen of the mobile phone to be screen-off. This includes the main screen display area being screen-off and the back screen display area being screen-off.

S304: In response to switching of the foldable screen of the mobile phone from the unfolded state to the folded state, the mobile phone first performs a first operation and then performs a second operation. The first operation is used to indicate the main screen to display an always on display interface. The second operation is used to indicate the mobile phone to display an always on display interface on the back screen and the main screen to be screen-off.

The first operation may be an operation of exiting the inverted screen-off logic. The second operation may be an operation of executing back screen always on display logic.

In this embodiment of this application, after the mobile phone in the inverted state enters the always on display state, when the foldable screen is switched from the unfolded state to the folded state, the mobile phone first displays the always on display interface on the main screen. Then, the mobile phone displays the always on display interface on the back screen, and the main screen is screen-off. In this way, the following problem can be resolved: After the mobile phone in the inverted state enters the always on display state, and the foldable screen is switched to the folded state from the unfolded state, the back screen cannot be lit up.

Figure 12:
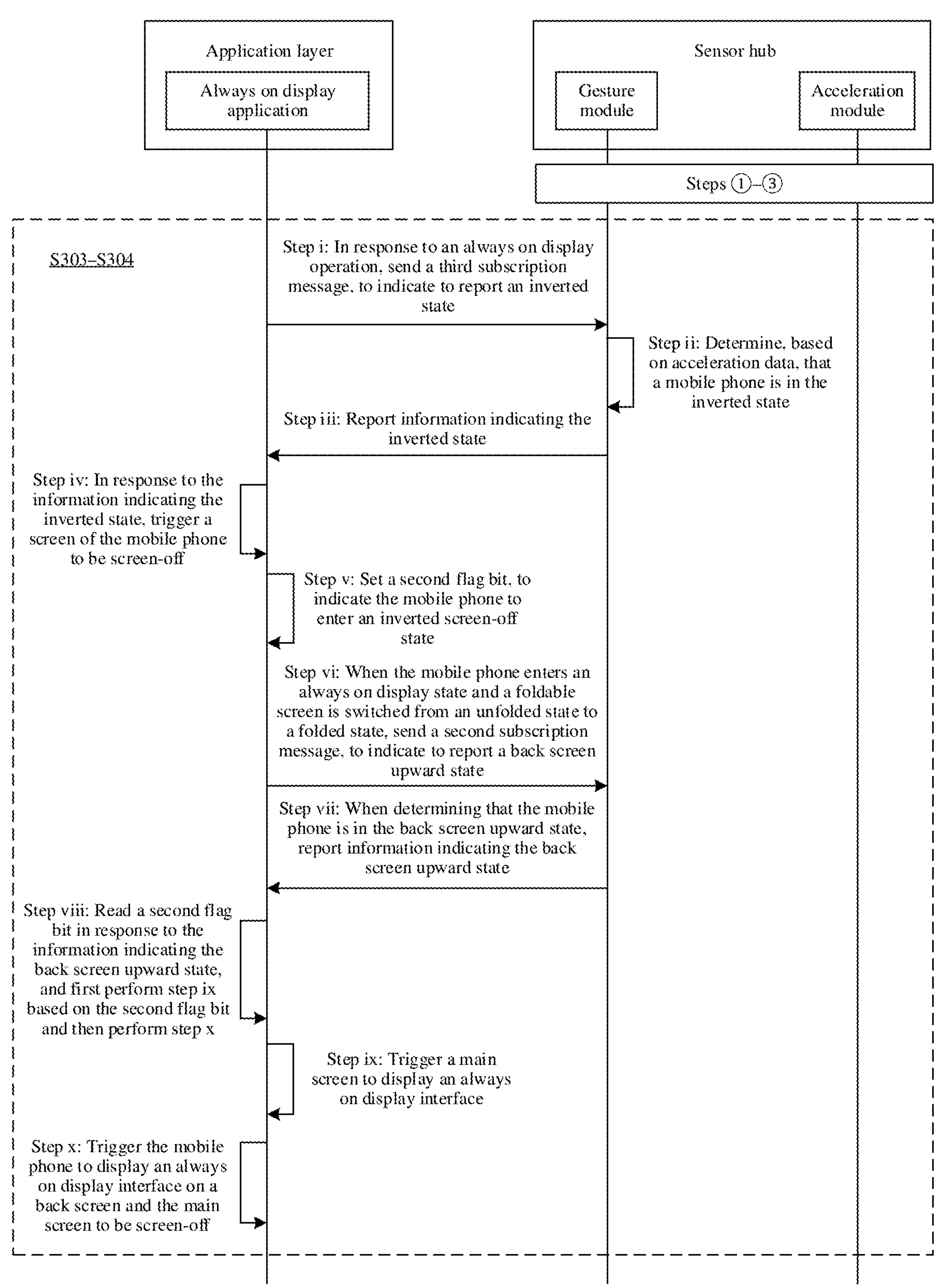
FIG. 12 is a schematic flowchart 5 of an always on display method according to an embodiment of this application.

For example, as shown in FIGS. 12, S303 and S304 may be specifically implemented in the following steps. For example, an application layer of the mobile phone includes an always on display application, and a sensor hub includes a gesture module and an acceleration module. S303 and S304 may specifically include step i to step x.

It should be noted that in the embodiment shown in FIG. 12, after the mobile phone is powered on, step ① to step ③ may be performed. For specific description, refer to the foregoing embodiment. Details are not described again.

Step i: In response to an always on display operation, the always on display application of the mobile phone sends a third subscription message to the gesture module, to indicate the gesture module to report the inverted state.

It may be understood that subscription for a back screen upward event is triggered after the foldable screen of the mobile phone in the folded state enters the always on display state; and when the foldable screen of the mobile phone is in the unfolded state, subscription for an invert event is triggered if the mobile phone enters the always on display state. Therefore, when the foldable screen of the mobile phone is in the unfolded state, in response to the always on display operation, the always on display application of the mobile phone subscribes to the gesture module for the invert event.

Optionally, when the mobile phone is in the unfolded state, in response to the always on display operation, the always on display application of the mobile phone enables an inverted screen-off function, and sends the third subscription message to the gesture module, that is, subscribes for the invert event.

For description of an example of step i, refer to the foregoing step ⑥. Details are not described again.

Step ii: The gesture module of the mobile phone determines, based on the acceleration data, that the mobile phone is in the inverted state.

For description of an example of step ii, refer to the foregoing step ⑩. Details are not described again.

Step iii: The gesture module of the mobile phone reports, to the always on display application, the information indicating the inverted state.

For description of an example of step iii, refer to the foregoing step ⑬. Details are not described again.

Step iv: In response to the information indicating the inverted state, the always on display application of the mobile phone triggers the screen of the mobile phone to be screen-off.

For description of an example of step iv, refer to the foregoing step ⑭. Details are not described again.

Step v: The always on display application of the mobile phone sets a second flag bit, to indicate the mobile phone to enter the inverted screen-off state.

For example, the second flag bit may be expressed as: g_invert mode.

Optionally, the always on display application of the mobile phone may call a function (SendCommand) to perform step iv, that is, perform inverted screen-off logic. On this basis, after the always on display application of the mobile phone calls a function (SendCommand), the second flag bit is set. For example, g_invert mode is set to true.

Step vi: When the mobile phone enters the always on display state and the foldable screen is switched from the unfolded state to the folded state, the always on display application of the mobile phone sends a second subscription message to the gesture module, to indicate the gesture module to report the back screen upward state.

It may be understood that subscription for the back screen upward event may be triggered after the foldable screen of the mobile phone is in the folded state and enters the always on display state. Therefore, the always on display application of the mobile phone sends the second subscription message to the gesture module, to subscribe for the back screen upward event.

For description of an example of step vi, refer to the foregoing step ⑤. Details are not described again.

Step vii: When determining that the mobile phone is in the back screen upward state, the gesture module of the mobile phone reports, to the always on display application, the information indicating the back screen upward state.

For description of an example of step vii, refer to the foregoing step ⑧. Details are not described again.

Step viii: The always on display application of the mobile phone reads the second flag bit in response to the information indicating the back screen upward state, and first performs step ix based on the second flag bit and then performs step x.

Optionally, in response to the information indicating the back screen upward state, the always on display application of the mobile phone first enables the back screen always on display function and then reads the first flag bit.

Optionally, the always on display application of the mobile phone determines, based on the second flag bit, whether the mobile phone enters the inverted screen-off state. If the mobile phone currently enters the inverted screen-off state, the always on display application of the mobile phone first performs step ix (for example, exit the inverted screen-off logic), and then performs step x (for example, the back screen always on display logic).

For example, if the mobile phone currently enters the inverted screen-off state, the always on display application of the mobile phone first calls a function (SendCommand), to exit the inverted screen-off logic. To be specific, a partial area of the main screen is lit up, and displays the always on display interface. Then, a function (setDisplayMode) is called to execute the back screen always on display logic. To be specific, the back screen displays the always on display interface, and the main screen is screen-off.

As shown in FIG. 12, step ix includes: The always on display application of the mobile phone triggers the main screen to display the always on display interface. Step x includes: The always on display application of the mobile phone triggers the mobile phone to display the always on display interface on the back screen and the main screen to be screen-off.

In this embodiment, the second flag bit is set after the mobile phone in the inverted state enters the always on display state, to indicate the mobile phone to enter the inverted screen-off state. On this basis, when the foldable screen of the mobile phone is switched from the unfolded state to the folded state, the mobile phone may trigger, based on the second flag bit, the main screen of the mobile phone to display the always on display interface, then display the always on display interface on the back screen, and make the main screen to be screen-off. In this way, the following problem can be resolved: After the mobile phone in the inverted state enters the always on display state, and the foldable screen is switched to the folded state from the unfolded state, the back screen cannot be lit up.

It should be noted that the content described in embodiments of this application can explain and illustrate the technical solutions in other embodiments of embodiments of this application, and the technical features described in embodiments can also be applied in other embodiments and combined with the technical features in other embodiments to form a new solution. The embodiments listed in this application are merely described as examples, and are not intended to limit this application thereto.

An embodiment of this application provides an electronic device. The electronic device may include a foldable screen. The foldable screen is capable of being folded into at least two screens. The at least two screens include a first screen and a second screen. When the foldable screen is in a folded state, the first screen faces away from the second screen. The electronic device further includes a memory and one or more processors. The memory stores computer program code. The computer program code includes computer instructions. When the computer instructions are executed by the processor, the electronic device is enabled to perform the functions or the steps performed by the mobile phone. For a structure of the electronic device, refer to the structure of the electronic device 100 shown in FIG. 5.

Figure 13:
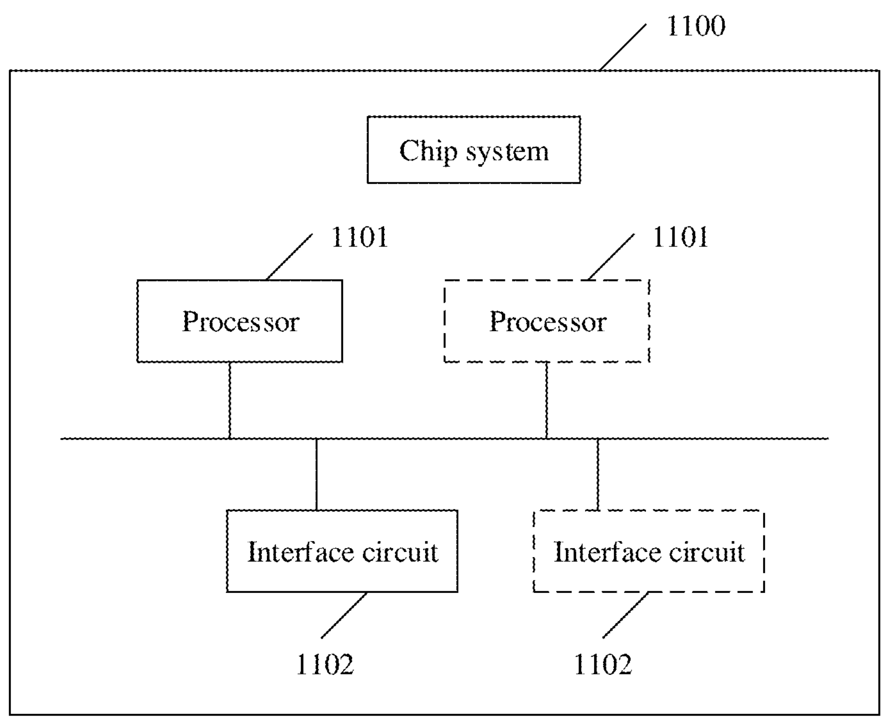
FIG. 13 is a diagram of a structure of a chip system according to an embodiment of this application.

An embodiment of this application further provides a chip system applied to an electronic device. As shown in FIG. 13, a chip system 1100 includes at least one processor 1101 and at least one interface circuit 1102. The processor 1101 may be the processor 110 shown in FIG. 5 in the foregoing embodiments. The interface circuit 1102 may be, for example, an interface circuit between the processor 110 and an external memory, or may be an interface circuit between the processor and the internal memory 121.

The processor 1101 and the interface circuit 1102 may be interconnected through a line. For example, the interface circuit 1102 may be configured to receive a signal from another apparatus (such as a memory of the electronic device 100). For another example, the interface circuit 1102 may be configured to transmit a signal to another apparatus (such as the processor 1101). For example, the interface circuit 1102 may read instructions stored in the memory and transmit the instructions to the processor 1101. When the instructions are executed by the processor 1101, the electronic device may be enabled to perform the functions or the steps performed by the mobile phone in the foregoing embodiments. Certainly, the chip system may further include other discrete devices. This is not specifically limited in embodiments of this application.

An embodiment of this application further provides a non-transitory computer-readable storage medium. The non-transitory computer-readable storage medium includes computer instructions. The computer instructions, when run on an electronic device, enable the electronic device to perform various functions or steps performed by the mobile phone in the foregoing method embodiments.

An embodiment of this application further provides a computer program product. When the computer program product runs on a computer, the computer is enabled to perform various functions or steps performed by a mobile phone in the above method embodiments.

It should be noted that, in the specification, claims, and drawings of this application, the terms such as "first" and "second" are intended to distinguish between different objects, and not used to describe a specific order of the objects. The terms "first" and "second" are used for descriptive purposes only and should not be construed as indicating or implying relative importance or implicitly indicating a quantity of technical features indicated. Therefore, features defining "first" and "second" may explicitly or implicitly include one or more such features. In the description of embodiments, unless otherwise specified, "a plurality of" means two or more.

In addition, the terms "include", "have", and any variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more. "A plurality of" means two or more. The term "at least two (items)" means two, or three, or more The "and/or" is used to describe an association relationship between the associated objects, and indicates that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof indicates any combination of these items, including any combination of singular items (pieces) or plural items (pieces). For example, at least one of a, b, or c may indicate a, b, c, a and b, a and c, b and c, or a, b, and c, where a, b, and c may be singular or plural. "When" and "if" mean that corresponding processing is performed in an objective situation, are not intended to limit time, do not require a determining action during implementation, and do not mean any other limitation.

In the embodiments of this application, words such as "example" or "for example" are used to indicate an example, illustration, or description. Any embodiment or design scheme described as an "example" or "for example" in embodiments of this application should not be explained as being more preferred or having more advantages than another embodiment or design scheme. Exactly, use of the terms such as "example" or "for example" is intended to present a related concept in a specific manner for ease of understanding.

Based on the foregoing descriptions of the implementations, a person skilled in the art may clearly understand that for the purpose of convenient and brief description, division of the foregoing function modules is used as an example for illustration. In actual application, the foregoing functions can be allocated to different function modules and implemented based on systems. To be specific, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementation. For example, a plurality of units or components may be combined or integrated into another apparatus, or some features may be ignored or not performed. In addition, the displayed or discussed mutual couplings, direct couplings, or communication connections may be implemented through some interfaces. Indirect couplings or communication connections between apparatuses or units may be implemented in an electrical form, a mechanical form, or other forms.

The units described as separate parts may or may not be physically separate, and parts displayed as units may be one or more physical units, may be located in one place, or may be distributed in multiple different places. Some or all of the units may be selected according to actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in the form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The above storage medium includes: any medium that may store a program code, such as a USB flash drive, a removable hard disk, a read only memory (read only memory, ROM), a random access memory (random access memory, RAM), a magnetic disk, or a compact disc.

The foregoing content are merely specific implementations of this application, but are not intended to limit the protection scope of this application. Any variation or replacement within the technical scope disclosed in this application shall fall within the protection scope of this application. Therefore, the protection scope of this application shall be used as protection scope of the claims.

What is claimed is:

1. A method, applied to an electronic device, the foldable device comprises a foldable screen, the foldable screen is capable of being folded into a main screen and a back screen, when the foldable screen is in a folded state, the main screen and the back screen are opposite to each other, and the electronic device comprises a first processor and a second processor; and the method comprises:

when the foldable screen is in the folded state, the main screen faces upward, the back screen faces downward, and the back screen is screen-off; when an always on display function of the electronic device is enabled, a back screen always on display function is in an enabled state, and an inverted screen-off display function is in an enabled state, the main screen displays an always on display interface in response to an always on display operation; based on a flip operation performed by a user on the electronic device in the folded state, the main screen faces downward, the back screen faces upward, and the second processor of the electronic device reports first information to the first processor and does not report second information, wherein the first information is different from the second information; and based on the first information, the back screen displays an always on display interface, and the main screen is screen-off, and when the foldable screen is in the folded state, the main screen faces upward, the back screen faces downward, and the back screen is screen-off; when the always on display function of the electronic device is enabled, the back screen always on display function is in a disabled state, and the inverted screen-off display function is in the enabled state, the main screen displays the always on display interface in response to the always on display operation; based on the flip operation performed by the user on the electronic device in the folded state, the main screen faces downward, the back screen faces upward, and the second processor of the electronic device reports the second information to the first processor and does not report the first information; and based on the second information, the main screen is screen-off, and the back screen is screen-off.

2. The method according to claim 1, wherein the first information comprises that the electronic device is in a back screen upward state, and the second information comprises that the electronic device is in an inverted state.

3. The method according to claim 2, wherein the second processor of the electronic device reporting the first information to the first processor and not reporting the second information comprises:

determining, by the second processor of the electronic device, that the electronic device is in the back screen upward state, and reporting the first information to the first processor; and after the second processor of the electronic device reports the first information to the first processor, determining, by the second processor of the electronic device, that the electronic device is in the inverted state, and intercepting the second information.

4. The method according to claim 3, wherein determining, by the second processor of the electronic device, that the electronic device is in the inverted state, and intercepting the second information comprises:

determining, by the second processor of the electronic device, that the electronic device is in the inverted state, subscribing, by the first processor of the electronic device, to the second processor for a back screen upward event, and intercepting the second information, wherein the subscription for the back screen upward event indicates that the second processor reports the first information to the first processor when determining that the electronic device is in the back screen upward state.

5. The method according to claim 4, wherein subscribing, by the first processor of the electronic device, to the second processor for the back screen upward event comprises:

after the electronic device displays the always on display interface on the main screen in response to the always on display operation, subscribing, by the first processor of the electronic device, to the second processor for the back screen upward event.

6. The method according to claim 1, wherein the second processor of the electronic device not reporting the second information to the first processor comprises:

determining, by the second processor of the electronic device, that the electronic device is in the inverted state, and obtaining a first flag bit, wherein the first flag bit indicates whether the second processor intercepts the second information; and if the first flag bit indicates that the second processor intercepts the second information, skipping reporting, by the second processor, the second information to the first processor.

7. The method according to claim 6, further comprising:

after the first processor of the electronic device subscribes to the second processor for the back screen upward event, setting, by the second processor of the electronic device, the first flag bit.

8. A method, applied to an electronic device comprising a foldable screen, wherein the foldable screen is capable of being folded into a main screen and a back screen, when the foldable screen is in a folded state, and the main screen faces away from the back screen; the method comprising:

when the foldable screen is in an unfolded state, the foldable screen is screen-on;

the foldable screen faces downward based on a flip operation performed by a user on the electronic device in the unfolded state; and when an always on display function of the electronic device is enabled, and an inverted screen-off display function is in an enabled state, the foldable screen is screen-off in response to an always on display operation; and based on a folding operation performed by the user on the electronic device in the unfolded state, the main screen faces downward, and the back screen faces upward; in response to the folding operation, the main screen displays an always on display interface, and the back screen is screen-off; and after the main screen displays the always on display interface, and the back screen is screen-off, the main screen is screen-off, and the back screen displays an always on display interface.

9. The method according to claim 8, wherein, in response to the folding operation, the main screen displays the always on display interface, and the back screen is screen-off; and after the main screen displays the always on display interface, and the back screen is screen-off, the main screen is screen-off, and the back screen displays the always on display interface comprises:

reading a second flag bit in response to the folding operation, wherein the second flag bit indicates whether the electronic device is in an inverted screen-off state, and when the second flag bit indicates that the electronic device is currently in the inverted screen-off state, the main screen displays the always on display interface, and the back screen is screen-off; and after the main screen displays the always on display interface, and the back screen is screen-off, the main screen is screen-off, and the back screen displays the always on display interface.

10. The method according to claim 9, wherein after the foldable screen is screen-off in response to the always on display operation, the method further comprises:

setting, by the first processor of the electronic device, the second flag bit.

11. An electronic device, comprising:

a foldable screen, a memory, and one or more processors, wherein the foldable screen is capable of being folded into a main screen and a back screen, and when the foldable screen is in a folded state, the main screen faces away from the back screen; and the memory stores computer program code, and the computer program code comprises computer instructions; when the computer instructions are executed by the processor, the electronic device is enabled to perform the method, and the method comprises:

when the foldable screen is in the folded state, the main screen faces upward, the back screen faces downward, and the back screen is screen-off; when an always on display function of the electronic device is enabled, a back screen always on display function is in an enabled state, and an inverted screen-off display function is in an enabled state, the main screen displays an always on display interface in response to an always on display operation; based on a flip operation performed by a user on the electronic device in the folded state, the main screen faces downward, the back screen faces upward, and the second processor of the electronic device reports first information to the first processor and does not report second information, wherein the first information is different from the second information; and based on the first information, the back screen displays an always on display interface, and the main screen is screen-off; and when the foldable screen is in the folded state, the main screen faces upward, the back screen faces downward, and the back screen is screen-off; when the always on display function of the electronic device is enabled, the back screen always on display function is in a disabled state, and the inverted screen-off display function is in the enabled state, the main screen displays the always on display interface in response to the always on display operation; based on the flip operation performed by the user on the electronic device in the folded state, the main screen faces downward, the back screen faces upward, and the second processor of the electronic device reports the second information to the first processor and does not report the first information; and based on the second information, the main screen is screen-off, and the back screen is screen-off.

* * * * *